United States Patent
Morimoto et al.

(10) Patent No.: US 10,934,961 B2
(45) Date of Patent: Mar. 2, 2021

(54) CONTROL DEVICE FOR ENGINE

(71) Applicant: Mazda Motor Corporation, Hiroshima (JP)

(72) Inventors: Hiroki Morimoto, Aki-gun (JP); Takeshi Tsugawa, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/785,901

(22) Filed: Feb. 10, 2020

(65) Prior Publication Data

US 2020/0386181 A1    Dec. 10, 2020

(30) Foreign Application Priority Data

Jun. 6, 2019   (JP) .............................. JP2019-106191

(51) Int. Cl.
| | |
|---|---|
| *F02D 41/22* | (2006.01) |
| *F02D 41/40* | (2006.01) |
| *F02P 5/10* | (2006.01) |
| *F02D 9/08* | (2006.01) |
| *F02D 41/28* | (2006.01) |

(52) U.S. Cl.
CPC .............. *F02D 41/22* (2013.01); *F02D 9/08* (2013.01); *F02D 41/28* (2013.01); *F02D 41/401* (2013.01); *F02P 5/103* (2013.01); *F02D 2041/286* (2013.01); *F02D 2200/024* (2013.01)

(58) Field of Classification Search
CPC .......... F02D 41/22; F02D 9/08; F02D 41/401; F02D 41/28; F02D 2200/024; F02D 2041/286; F02P 5/103
See application file for complete search history.

(56) References Cited

U.S. PATENT DOCUMENTS

| | | | | |
|---|---|---|---|---|
| 9,897,034 | B2* | 2/2018 | Tsugawa | ............. F02D 13/0207 |
| 10,450,970 | B2* | 10/2019 | Huang | ................ F02D 19/0623 |
| 10,480,479 | B2* | 11/2019 | Nakashima | ............. F02P 5/153 |
| 2009/0277247 | A1* | 11/2009 | Hagari | .................... F02P 5/152 |
| | | | | 73/35.04 |

(Continued)

FOREIGN PATENT DOCUMENTS

JP           201939383 A       3/2019

*Primary Examiner* — Carl C Staubach
(74) *Attorney, Agent, or Firm* — Alleman Hall Creasman & Tuttle LLP

(57) ABSTRACT

A control device for controlling an engine including an injector that supplies fuel into a cylinder and an in-cylinder pressure sensor that detects an in-cylinder pressure being a pressure inside the cylinder, is provided. The device includes a processor configured to execute an abnormal combustion determining module to determine whether combustion of a mixture gas inside the cylinder is abnormal based on a detection value of the in-cylinder pressure sensor. The abnormal combustion determining module determines that an abnormal combustion has occurred in which progress of the combustion of the mixture gas is excessively fast, when an in-cylinder pressure intensity that is a spectrum value of a frequency component of an in-cylinder pressure waveform less than a given reference frequency is greater than or equal to a given determination intensity, the in-cylinder pressure waveform being detected by the in-cylinder pressure sensor.

6 Claims, 17 Drawing Sheets

(56) References Cited

U.S. PATENT DOCUMENTS

2016/0298553 A1* 10/2016 Angeby ................ G01L 23/221
2017/0167952 A1*  6/2017 Hiroi ..................... F02D 41/28
2017/0184047 A1*  6/2017 Shirahashi ............ F02D 41/402
2017/0350328 A1* 12/2017 Matsushima ......... F02D 35/027
2019/0063394 A1   2/2019 Nakashima et al.

* cited by examiner

CONTROL DEVICE FOR ENGINE

TECHNICAL FIELD

The present disclosure relates to a control device for an engine, which includes a cylinder and an injector which supplies fuel into the cylinder.

BACKGROUND OF THE DISCLOSURE

JP2019-039383A discloses an engine provided to a vehicle, etc. The engine is provided with a pressure sensor which detects pressure inside a cylinder so as to determine whether combustion inside the cylinder is appropriate based on the detected pressure by the pressure sensor. Specifically, the engine of JP2019-039383A determines that combustion noise exceeds a specific level when the detected pressure by the pressure sensor is above a given value, and retards a timing of igniting a mixture gas inside the cylinder.

Pressure inside a cylinder changes according to a combustion state of the mixture gas inside the cylinder. However, with the configuration in which the pressure sensor which detects the pressure inside the cylinder is attached to an engine body and the combustion state of the mixture gas is determined simply based on a highest value detected by the pressure sensor, the combustion state of the mixture gas may not be detected accurately. In other words, there is room for improvement in the configuration of JP2019-039383A in terms of improving the detection accuracy of the combustion state of the mixture gas.

SUMMARY OF THE DISCLOSURE

The present disclosure is made in view of the above situations and aims to provide a control device for an engine, which is improved in accuracy when detecting a combustion state inside a cylinder.

As a result of extensive research on the above matter conducted by the present inventors, they have discovered that when a combustion state of a mixture gas is determined simply based on the highest value detected by a pressure sensor, its determination accuracy degrades due to a cavernous resonance caused inside the cylinder at the time of combustion of the mixture gas. Specifically, in the cavernous resonance, a region inside the cylinder corresponds to a node of a pressure wave and another region corresponds to an antinode of the pressure wave. Therefore, in the configuration in which the pressure inside the cylinder is detected by the pressure sensor, the detected pressure value varies depending on the position of the pressure sensor. In other words, when the pressure sensor is disposed at a position corresponding to the antinode of the pressure wave, the detected pressure is high, whereas when the pressure sensor is disposed at a position corresponding to the node of the pressure wave, the detected pressure is low. Moreover, the position of the node/antinode of the pressure wave changes depending on an engine speed, etc. Thus, with the configuration in which the combustion state of the mixture gas is determined simply based on the highest value detected by the pressure sensor, the highest value of the pressure inside the cylinder cannot suitably be detected and the determination accuracy of the combustion state of the mixture gas degrades. Furthermore, the present inventors gained the knowledge that a frequency of the pressure wave accompanying the cavernous resonance is greater than the given value and, in the pressure wave of a frequency less than a given value, a pressure difference depending on the position becomes smaller and the pressure corresponding to the combustion state of the mixture gas is detectable at any position inside the cylinder.

According to one aspect of the present disclosure, a control device for controlling an engine including an injector that supplies fuel into a cylinder and an in-cylinder pressure sensor that detects an in-cylinder pressure being a pressure inside the cylinder, is provided. The device includes a processor configured to execute an abnormal combustion determining module to determine whether combustion of the mixture gas inside the cylinder is abnormal based on a detection value of the in-cylinder pressure sensor. The abnormal combustion determining module determines that an abnormal combustion has occurred in which progress of the combustion of the mixture gas is excessively fast, when an in-cylinder pressure intensity that is a spectrum value of a frequency component of an in-cylinder pressure waveform less than a given reference frequency is greater than or equal to a given determination intensity, the in-cylinder pressure waveform being detected by the in-cylinder pressure sensor.

According to this configuration, the combustion state of the mixture gas is determined based on the spectrum value of the frequency component of the in-cylinder pressure waveform less than the given reference frequency, i.e., based on the pressure intensity inside the cylinder which is the intensity of the pressure waveform inside the cylinder from which an influence of cavernous resonance is almost eliminated and almost depends on only combustion of the mixture gas. Therefore, the combustion state of the mixture gas is accurately determined regardless of the position of the in-cylinder pressure sensor. Further, when the progress of the combustion of the mixture gas is fast, more in detail, when the combustion start timing of the mixture gas is early or when the combustion speed of the mixture gas is fast, the in-cylinder pressure increases. In this regard, according to this configuration, when the in-cylinder pressure intensity which is the spectrum value is greater than or equal to the given determination intensity, it is determined that the abnormal combustion in which the combustion progress is excessively fast has occurred. Therefore, whether the abnormal combustion in which the combustion progress is excessively fast has occurred is accurately determined.

The abnormal combustion determining module may include a filtering module configured to extract a frequency component less than the reference frequency and greater than a given second reference frequency from the in-cylinder pressure waveform detected by the in-cylinder pressure sensor, an intensity calculating module configured to calculate a value of the spectrum of the extracted frequency component as the in-cylinder pressure intensity, and a determining module configured to determine that the abnormal combustion has occurred when the in-cylinder pressure intensity calculated by the intensity calculating module is greater than or equal to the determination intensity.

According to this configuration, the intensity (spectrum) is calculated only for the pressure waveform after the pressure waveform with the frequency greater than the reference frequency and the pressure waveform with the frequency less than the second reference frequency are eliminated by the filtering module. Thus, the calculation of the in-cylinder pressure intensity and the determination whether the abnormal combustion has occurred are performed more easily.

The control device may further include an ignition plug configured to ignite the mixture gas inside the cylinder at a given ignition timing. The abnormal combustion determining module may determine that a first abnormal combustion, in which the progress of the combustion of the mixture gas is changeable by changing the ignition timing has occurred when an index period from the ignition timing to a timing of completion of combustion of a given rate of fuel supplied into the cylinder in one combustion cycle is a given determination period or longer and the in-cylinder pressure intensity is greater than or equal to the given determination intensity, and determine that a second abnormal combustion, in which the progress of the combustion of the mixture gas is not changable by changing the ignition timing has occurred when the index period is shorter than the determination period and the in-cylinder pressure intensity is greater than or equal to the determination intensity.

According to this configuration, the abnormal combustion of which the combustion progress is excessively fast is determined by dividing it into the first abnormal combustion in which the combustion progress is changeable by changing the ignition timing and the second abnormal combustion in which the combustion progress is not changeable by changing the ignition timing. Further, based on this determination, the control suitable to the respective abnormal combustions can be performed, and the suitable combustion of the mixture gas can be achieved more reliably.

The injector may retard a fuel injection timing when the abnormal combustion determining module determines that the second abnormal combustion has occurred.

According to this configuration, when the second abnormal combustion has occurred in which the index period is shorter than the determination period and the in-cylinder pressure intensity is greater than or equal to the determination intensity, and the combustion progress cannot be changed by changing the ignition timing, the fuel injection timing is retarded. When the fuel injection timing is retarded, since the period of time from the start of mixing fuel and air until reaching near a compression top dead center is shortened, the progress of the reaction of fuel with air near the compression top dead center becomes slower. Moreover, when the fuel injection timing is retarded, the temperature of the mixture gas is effectively reduced by the latent heat of vaporization of the fuel at the timing closer to the compression top dead center. Thus, even when the second abnormal combustion in which the combustion progress is not changeable by changing the ignition timing has occurred, by slowing down the combustion progress near the compression top dead center, suitable combustion is achieved.

The control device may further include a throttle valve configured to change an amount of air introduced into the cylinder. The throttle valve may reduce the amount of air introduced into the cylinder when the abnormal combustion determining module determines that the second abnormal combustion has occurred.

According to this configuration, even when the second abnormal combustion in which the combustion progress is not changeable by changing the ignition timing has occurred, by reducing the amount of air, the combustion progress of the mixture gas can be reduced by slowing down the reaction of air and fuel, and the combustion of the mixture gas thereafter can be performed suitably.

When the abnormal combustion determining module determines that the first abnormal combustion has occurred, the ignition plug may retard the timing of igniting the mixture gas.

According to this configuration, when the index period is the determination period or longer and the in-cylinder pressure intensity is greater than or equal to the determination intensity and the first abnormal combustion which the combustion progress is changeable by changing the ignition timing has occurred, by retarding the ignition timing, the start timing of the combustion of the mixture gas is retarded and the combustion speed of the mixture gas and the progress thereof is slowed down.

The abnormal combustion determining module may determine that the second abnormal combustion has occurred when the in-cylinder pressure intensity in the cylinder is greater than or equal to the determination intensity and a combustion cycle in which the index period is the determination period or longer continues for a given number of times.

According to this configuration, a false detection of the second abnormal combustion can be prevented.

The injector and the ignition plug may supply the fuel into the cylinder and ignite the mixture gas inside the cylinder such that a portion of the mixture gas in the cylinder is ignited by the ignition plug and combusts by spark ignition and the remaining mixture gas combusts by self-ignition.

BRIEF DESCRIPTION OF DRAWINGS

FIG. 6A is of sound and FIG. 6B is of an in-cylinder pressure.

DETAILED DESCRIPTION OF THE DISCLOSURE

(1) Overall Configuration of Engine

Figure 1:
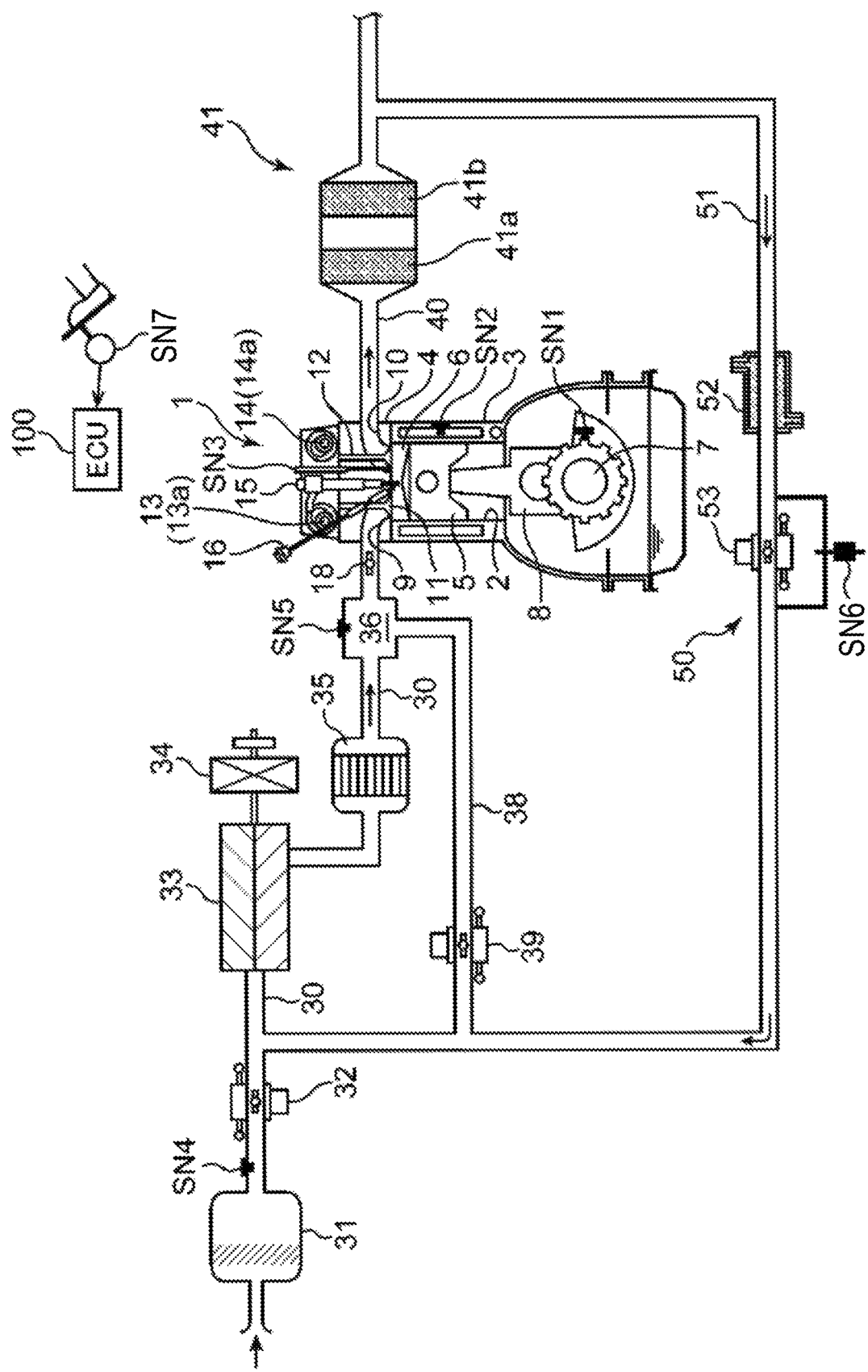
FIG. 1 is a system diagram schematically illustrating an overall configuration of an engine according to one embodiment of the present disclosure.

FIG. 1 is a system diagram schematically showing an overall configuration of an engine to which a method and device for controlling the engine according to the present disclosure is applied. The engine system illustrated in FIG. 1 is mounted on a vehicle and includes an engine body 1 serving as a drive source for traveling. In this embodiment, a four-cycle gasoline direct injection engine is used as the engine body 1. The engine system includes, in addition to the engine body 1, an intake passage 30 through which intake air to be introduced into the engine body 1 flows, an exhaust passage 40 through which exhaust gas discharged from the engine body 1 flows, and an exhaust gas recirculation (EGR) device 50 which recirculates a portion of the exhaust gas flowing through the exhaust passage 40 to the intake passage 30.

The engine body 1 has a cylinder block 3 formed therein with cylinders 2, a cylinder head 4 attached to an upper surface of the cylinder block 3 so as to cover above the cylinders 2, and a piston 5 reciprocatably fitted into each cylinder 2. The engine body 1 is of a multi-cylinder type having a plurality of cylinders (e.g., four cylinders arranged in a direction perpendicular to the paper of FIG. 1). Here, the description is only given regarding one of the cylinders 2 for the sake of simplicity.

A combustion chamber 6 is defined above the piston 5, and fuel containing gasoline as a main component is injected into the combustion chamber 6 by an injector 15 (described later). Further, the supplied fuel is combusted while being mixed with air in the combustion chamber 6, and expansion force caused by this combustion pushes down the piston 5 and thus it reciprocates in up-and-down directions of the cylinder. Note that the fuel injected into the combustion chamber 6 may be any fuel as long as it contains gasoline as the main component. It may contain a subcomponent, such as bioethanol, in addition to gasoline. The injector 15 injects the fuel dividedly a plurality of times during one combustion cycle.

A crankshaft 7, which is an output shaft of the engine body 1, is provided below the piston 5. The crankshaft 7 is connected to the piston 5 via a connecting rod 8 and rotates about its center axis according to the reciprocation (up-and-down motion) of the piston 5.

A geometric compression ratio of the cylinder 2, that is, a ratio of the volume of the combustion chamber 6 when the piston 5 is at a top dead center (TDC) with the volume of the combustion chamber 6 when the piston 5 is at a bottom dead center (BDC), is set 13:1 or higher and 30:1 or lower as a suitable value for SPCCI combustion (partial compression-ignition combustion) described later.

The cylinder block 3 is provided with a crank angle sensor SN1 which detects a rotational angle (crank angle) and rotational speed (engine speed) of the crankshaft 7. Moreover, the cylinder block 3 is provided with an engine water temperature sensor SN2 which detects a temperature of engine cooling water for cooling the engine body 1 through a water jacket formed in the cylinder block 3, i.e., an engine water temperature.

The cylinder head 4 is provided with an intake port 9 and an exhaust port 10 which open into the combustion chamber 6, an intake valve 11 which opens and closes the intake port 9, and an exhaust valve 12 which opens and closes the exhaust port 10. Note that the type of valve of the engine of this embodiment is a four-valve type including two intake valves and two exhaust valves. Two intake ports 9, two exhaust ports 10, two intake valves 11, and two exhaust valves 12 are provided for each cylinder 2. In this embodiment, a swirl valve 18 is provided to one of the two intake ports 9 for one cylinder 2 to be changeable of the intensity of a swirl flow (a circling flow around an axial line of the cylinder) inside the cylinder 2.

The intake valve 11 and the exhaust valve 12 are driven to open and close in conjunction with the rotation of the crankshaft 7 by valve operating mechanisms 13 and 14 including a pair of camshafts disposed in the cylinder head 4.

The valve operating mechanism 13 for the intake valve 11 is built therein with an intake VVT 13a changeable of at least an open timing of the intake valve 11. Similarly, the valve operating mechanism 14 for the exhaust valve 12 is built therein with an exhaust VVT 14a changeable of at least a close timing of the exhaust valve 12.

In this embodiment, by controlling the intake VVT 13a and the exhaust VVT 14a, a close timing of the exhaust valve 12 is retarded than an open timing of the intake valve 11, so that a valve overlap in which both the intake valve 11 and the exhaust valve 12 open for a given period of time is achieved. Further, by controlling the intake VVT 13a and the exhaust VVT 14a, this valve overlap period is changed. When the intake valve 11 and the exhaust valve 12 are driven to form the valve overlap, an internal EGR in which the burned gas is discharged from the combustion chamber 6 to at least one of the intake passage 30 and the exhaust passage 40 and then the burned gas is again introduced into the combustion chamber 6, is performed. Thus, the burned gas (internal EGR gas) remains inside the combustion chamber 6. The amount of the internal EGR gas changes depending on the valve overlap period, and thus, is adjusted by adjusting the valve overlap period. Note that the intake VVT 13a (exhaust VVT 14a) may be a variable mechanism which changes only the close timing (open timing) while fixing the open timing (close timing) of the intake valve 11 (exhaust valve 12), or a phase-variable mechanism which simultaneously changes the open timing and the close timing of the intake valve 11 (exhaust valve 12).

Each cylinder head 4 is provided with the injector 15 which injects the fuel (mainly gasoline) into the combustion chamber 6, and an ignition plug 16 which ignites a mixture gas containing the fuel injected into the combustion chamber 6 from the injector 15 and air introduced into the combustion chamber 6. Each cylinder head 4 is further provided with an in-cylinder pressure sensor SN3 which detects an in-cylinder pressure which is pressure of the combustion chamber 6.

The injector 15 is a multi-port injector having a plurality of nozzle ports at its tip portion, and the fuel is injected radially from the plurality of nozzle ports. The injector 15 is provided so that its tip portion opposes to a center portion of a crown surface of the piston 5. Note that in this embodiment, on the crown surface of the piston 5, a cavity is formed by denting an area of the piston 5, including a center part thereof, to the opposite side from the cylinder head 4 (downward).

The ignition plug 16 is disposed at a somewhat offset position to the intake side with respect to the injector 15.

The intake passage 30 is connected to one side surface of the cylinder head 4 to communicate with the intake ports 9. Air (intake air, fresh air) taken in from an upstream end of the intake passage 30 is introduced into the combustion chamber 6 through the intake passage 30 and the intake port 9.

In the intake passage 30, an air cleaner 31 which removes foreign matters within the intake air (air) introduced into the combustion chamber 6 (cylinder 2), a throttle valve 32, a supercharger 33 which pumps the intake air while compressing it, an intercooler 35 which cools the intake air compressed by the supercharger 33, and a surge tank 36 are provided in this order from the upstream side. The throttle valve 32 is a valve which opens and closes the intake passage 30, to change the amount of air introduced into the combustion chamber 6 (cylinder 2) by changing its opening.

An airflow sensor SN4 which detects a flow rate of intake air, and an intake air temperature sensor SN5 which detects a temperature of the intake air are provided in respective portions of the intake passage 30. The airflow sensor SN4 is provided in a portion of the intake passage 30 between the air cleaner 31 and the throttle valve 32, and detects the flow rate of intake air passing through this portion. The intake air pressure sensor SN5 is provided in the surge tank 36 and detects the temperature of intake air in the surge tank 36.

The supercharger 33 is a mechanical booster mechanically linked to the engine body 1. Although the specific type of the supercharger 33 is not particularly limited, for example, any of known boosters, such as a Lysholm type, a Roots type, or a centrifugal type, may be used as the supercharger 33.

An electromagnetic clutch 34 electrically switchable of its operation mode between "engaged" and "disengaged" is provided between the supercharger 33 and the engine body 1. When the electromagnetic clutch 34 is engaged, a driving force is transmitted from the engine body 1 to the supercharger 33, and boosting by the supercharger 33 is performed. On the other hand, when the electromagnetic clutch 34 is disengaged, the transmission of the driving force is interrupted, and the boosting by the supercharger 33 is stopped.

A bypass passage 38 which bypasses the supercharger 33 is provided in the intake passage 30. The bypass passage 38 connects the surge tank 36 to an EGR passage 51 described later. A bypass valve 39 is provided in the bypass passage 38. The bypass valve 39 adjusts the pressure of the intake air introduced into the surge tank 36, that is, the boosting pressure. For example, the flow rate of intake air passing through the bypass passage 38 increases as an opening of the bypass valve 39 increases, and as a result, the boosting pressure decreases.

The exhaust passage 40 is connected to the other side surface of the cylinder head 4 so as to communicate with the exhaust port 10. Burned gas (exhaust gas) generated in the combustion chamber 6 is discharged outside through the exhaust port 10 and the exhaust passage 40.

A catalytic converter 41 is provided in the exhaust passage 40. The catalytic converter 41 is built therein with a three-way catalyst 41a which purifies hazardous components contained within the exhaust gas (HC, CO and NOR), and a GPF (gasoline-particulate filter) 41b which captures particulate matter (PM) contained within the exhaust gas, in this order from the upstream side. Note that another catalytic converter built therein with a suitable catalyst, such as a three-way catalyst or a NO catalyst, may be added downstream of the catalytic converter 41.

The EGR device 50 has an EGR passage 51 connecting the exhaust passage 40 to the intake passage 30, and an EGR cooler 52 and an EGR valve 53 provided in the EGR passage 51. The EGR passage 51 connects a portion of the exhaust passage 40 downstream of the catalytic converter 41 to a portion of the intake passage 30 between the throttle valve 32 and the supercharger 33. The EGR cooler 52 cools the exhaust gas recirculated from the exhaust passage 40 to the intake passage 30 through the EGR passage 51 (external EGR gas) by heat exchange. The EGR valve 53 is provided in the EGR passage 51 downstream of the EGR cooler 52 (the side close to the intake passage 30), and adjusts the flow rate of the exhaust gas flowing through the EGR passage 51.

A pressure difference sensor SN6 which detects a difference between pressure upstream of the EGR valve 53 and pressure downstream thereof is provided in the EGR passage 51.

(2) Control System

Figure 2:
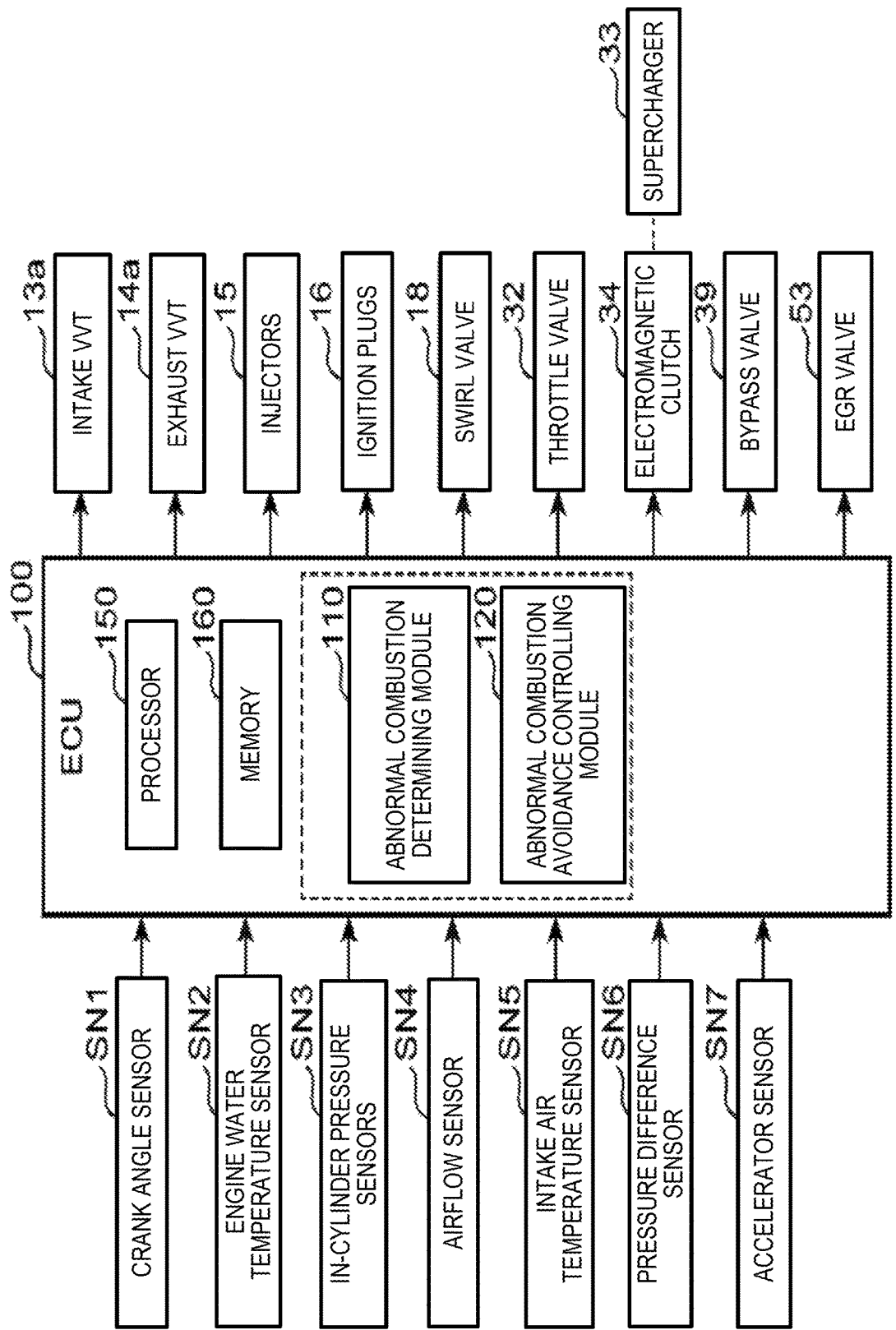
FIG. 2 is a block diagram illustrating a control system of the engine.

FIG. 2 is a block diagram illustrating a control system of the engine. An ECU (engine control module) 100 illustrated in FIG. 2 is a microcomputer which comprehensively controls the engine, and is comprised of a well-known processor (e.g. central processing unit (CPU)) 150, memory 160 (e.g., ROM and RAM), etc.

The ECU 100 receives detection signals from various sensors. For example, the ECU 100 is electrically connected to the crank angle sensor SN1, the engine water temperature sensor SN2, the in-cylinder pressure sensors SN3, the airflow sensor SN4, the intake air temperature sensor SN5, the pressure difference sensor SN6, which are described above. The ECU 100 sequentially receives the information detected by these sensors (i.e., the crank angle, the engine speed, the engine water temperature, the in-cylinder pressures, the intake air flow rate, the intake air temperature, and the difference in pressure between the upstream and downstream sides of the EGR valve 53).

Further, an accelerator sensor SN7 which detects an opening of an accelerator pedal controlled by a vehicle driver driving the vehicle is provided in the vehicle, and a detection signal from the accelerator sensor SN7 is also inputted to the ECU 100.

The ECU 100 controls various components of the engine while executing various determinations and calculations based on the input signals from the various sensors. That is, the ECU 100 is electrically connected to the intake VVT 13a, the exhaust VVT 14a, the injectors 15, the ignition plugs 16, the swirl valve 18, the throttle valve 32, the electromagnetic clutch 34, the bypass valve 39, the EGR valve 53, etc., and outputs control signals to these components based on various calculation results.

The ECU 100 further includes an abnormal combustion determining module 110 and an abnormal combustion avoidance controlling module 120 stored in the memory 160 as software modules. The processor 150 is configured to execute these modules to perform their respective functions.

(3) Basic Control

Figure 3:
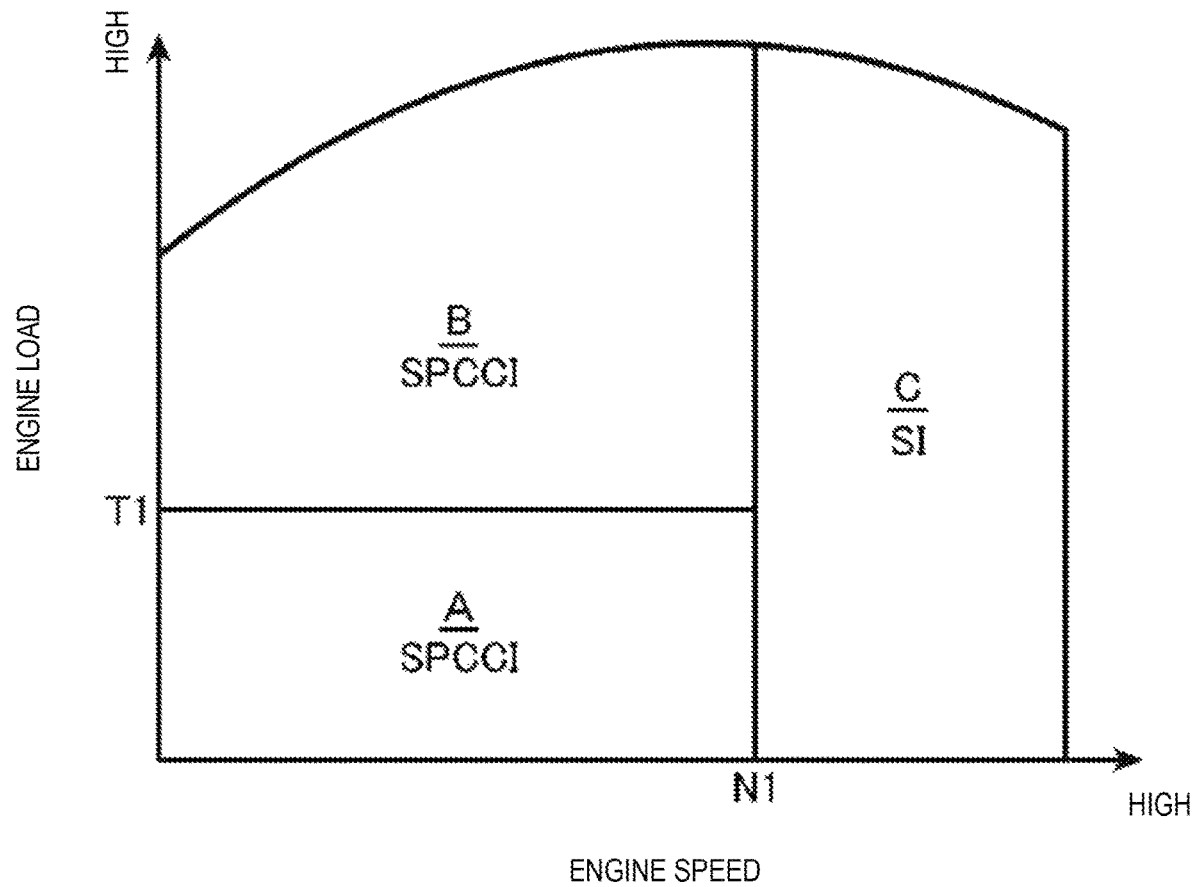
FIG. 3 is a chart of a map in which operating ranges of the engine are divided according to a difference in operation mode.

FIG. 3 is a chart of a map illustrating a difference in operation mode according to the engine speed and load. As illustrated in FIG. 3, an operating range of the engine is mainly divided into three operating ranges of a first operating range A, a second operating range B, and a third operating range C.

Within the third operating range C, the engine speed is greater than an SI execution speed N1. Within the first operating range A, the engine speed is less than the SI execution speed N1 and the engine load is less than a given switch load T1. The second operating range B is the operating range other than the first and third operating ranges A and C, in which the engine speed is less than the SI execution speed N1 and the engine load is greater than the given switch load T1.

Within the first and second operating ranges A and B, a compression-ignition combustion combining spark ignition (SI) combustion and compression ignition (CI) combustion (hereinafter referred to as "SPCCI combustion") is performed. Note that "SPCCI" in the SPCCI combustion is an abbreviation for "SPark Controlled Compression Ignition."

The SI combustion is a mode in which the mixture gas is ignited by the ignition plug 16 and is then forcibly combusted by flame propagation which spreads the combusting region from the ignition point. The CI combustion is a mode in which the mixture gas is combusted by self-ignition in an environment increased in temperature and pressure due to the compression of the piston 5. The SPCCI combustion combining the SI combustion and the CI combustion is a combustion mode in which the SI combustion is performed on a portion of the mixture gas inside the combustion chamber 6 by the spark-ignition performed in an environment immediately before the mixture gas self-ignites, and after the SI combustion, the CI combustion is performed on the remaining the mixture gas in the combustion chamber 6 by self-ignition (by the further increase in temperature and pressure accompanying the SI combustion).

Figure 4:
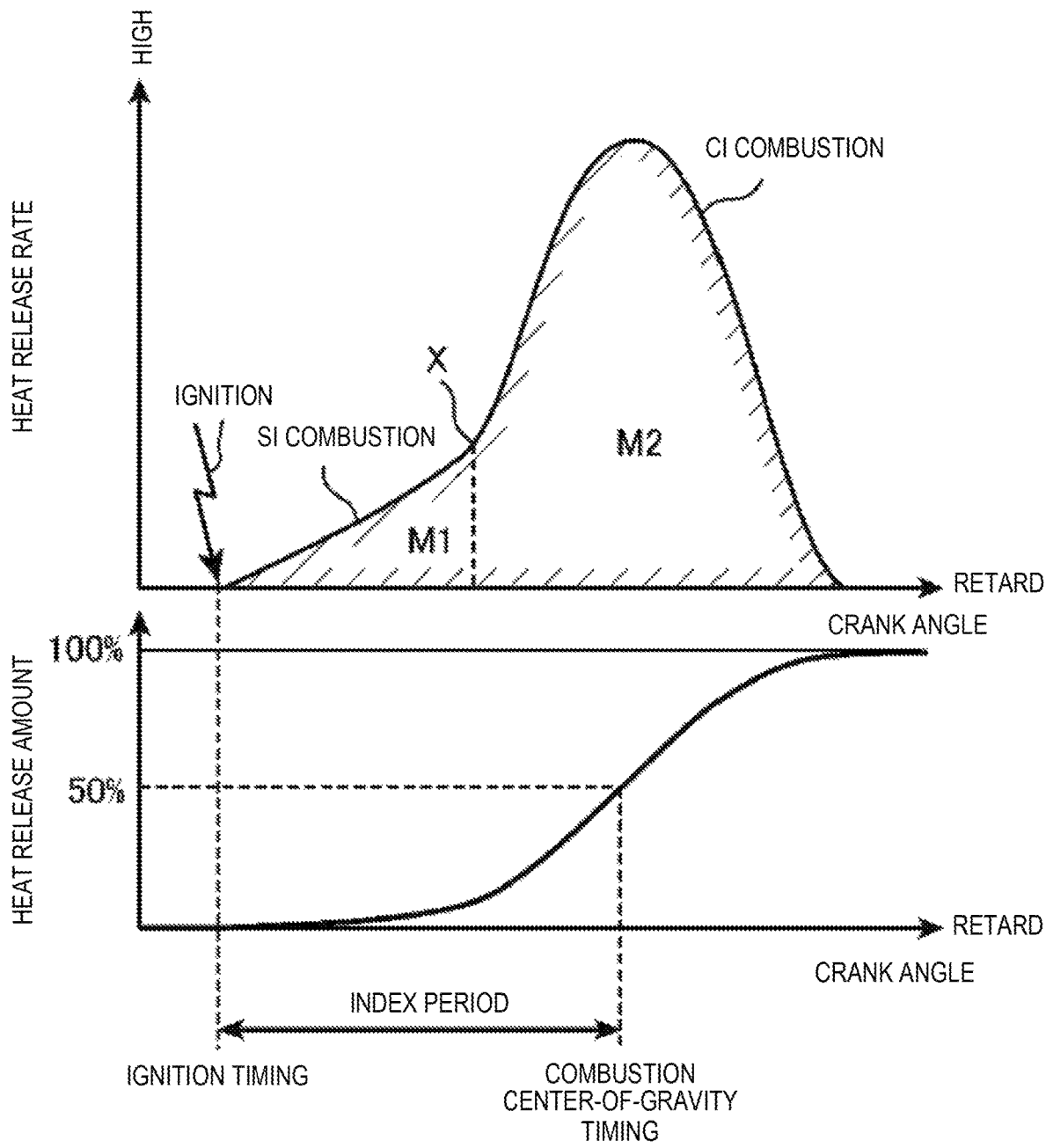
FIG. 4 is a chart illustrating waveforms of a heat release rate and a heat release amount in SPCCI combustion.

FIG. 4 is a chart illustrating a change in the heat release rate (J/deg) and a change in a heat release amount with respect to the crank angle when the SPCCI combustion has occurred. In the SPCCI combustion, the heat release in the SI combustion becomes slower than the heat release in the CI combustion. For example, as illustrated in FIG. 4, a waveform of a heat release rate when the SPCCI combustion is performed has a relatively shallow rising slope. Moreover, a pressure variation (i.e., $dP/d\theta$: P is the in-cylinder pressure and $\theta$ is the crank angle) in the combustion chamber 6 is shallower in the SI combustion than in the CI combustion. In other words, the waveform of the heat release rate caused by the SPCCI combustion is formed to have a first heat release rate portion (the portion indicated by M1) formed by the SI combustion and having a relatively shallow rising slope, and a second heat release rate portion (the portion indicated by M2) formed by the CI combustion and having a relatively sharp rising slope, which are next to each other in this order.

When the temperature and pressure inside the combustion chamber 6 rise due to the SI combustion, the unburned mixture gas self-ignites, and the CI combustion starts. As illustrated in FIG. 4, the slope of the waveform of the heat release rate changes from shallow to sharp at the timing of self-ignition (that is, the timing when the CI combustion starts). That is, the waveform of the heat release rate caused by the SPCCI combustion has a flection point at a timing when the CI combustion starts (indicated by an "X" in FIG. 4).

After the CI combustion starts, the SI combustion and the CI combustion are performed in parallel. In the CI combustion, since the heat release is greater than in the SI combustion, the heat release rate becomes relatively high. However, since the CI combustion is performed after TDC of compression stroke (CTDC), the slope of the waveform of the heat release rate does not become excessive. That is, after CTDC, since motoring pressure decreases due to the piston 5 descending, the rise of the heat release rate is prevented, which avoids excessive $dp/d\theta$ in the CI combustion. In the SPCCI combustion, due to the CI combustion being performed after the SI combustion as described above, it is unlikely for $dp/d\theta$ which is an index of combustion noise to become excessive, and combustion noise is reduced compared to performing the CI combustion alone (in the case where the CI combustion is performed on all the fuel).

The SPCCI combustion ends as the CI combustion finishes. Since the combustion speed of the CI combustion is faster than that of the SI combustion, the combustion end timing is advanced compared to performing the SI combustion alone (in the case where the SI combustion is performed on all the fuel). In other words, the SPCCI combustion brings the combustion end timing closer to CTDC, on the expansion stroke. Thus, the SPCCI combustion improves fuel efficiency compared to the SI combustion alone.

(a) First Operating Range A

Within the first operating range A, the SPCCI combustion is performed while an air-fuel ratio (A/F) in the combustion chamber 6 is set higher (lean) than the stoichiometric air-fuel ratio in order to improve fuel efficiency. Within the first operating range A, the air-fuel ratio in the combustion chamber 6 is increased until the amount of raw $NO_x$, that is $NO_x$ generated in the combustion chamber 6, becomes sufficiently small. For example, the air-fuel ratio in the combustion chamber 6 within the first operating range A is set to about 30:1.

Within the first operating range A, each part of the engine is driven as follows so that the above combustion is achieved.

Within the first operating range A, the injector 15 injects the fuel into the combustion chamber 6 so that the air-fuel ratio (A/F) in the combustion chamber 6 becomes exceeds the stoichiometric air-fuel ratio as described above. In this embodiment, the injector 15 is driven such that substantially all the fuel to be supplied to the combustion chamber 6 during one combustion cycle is injected into the combustion chamber 6 on the intake stroke. For example, within the first operating range A, a major portion of the fuel is injected during the intake stroke, and the remaining fuel is dividedly injected in the two injections during compression stroke.

Within the first operating range A, the ignition plug 16 ignites the mixture gas near TDC of the compression stroke (CTDC). This ignition triggers the SPCCI combustion, a portion of the mixture gas in the combustion chamber 6 is combusted through flame propagation (SI combustion), and then the remaining mixture gas is combusted by self-ignition (CI combustion). Note that in order to activate the mixture gas, an additional ignition may be performed before the ignition performed near the CTDC.

Within the first operating range A, the throttle valve 32 is fully opened or nearly fully opened.

Within the first operating range A, the EGR valve 53 is fully closed and the amount of the external EGR gas introduced into the combustion chamber 6 is set to zero.

If the internal EGR is performed and high-temperature burned gas remains in the combustion chamber 6, the temperature of the mixture gas is increased, so that the CI combustion of the mixture gas is suitably performed. Thus, within the first operating range A, the intake VVT 13a and the exhaust VVT 14a drive the intake valve 11 and the exhaust valve 12 such that the valve overlap period applies. In this embodiment, the intake valve 11 and the exhaust valve 12 are driven to open for a given period over TDC on the exhaust stroke.

Within the first operating range A, the opening of the swirl valve 18 is fully closed or narrowed to be close fully close.

Within the first operating range A, the supercharger 33 is stopped. That is, the electromagnetic clutch 34 is disengaged to disconnect the supercharger 33 from the engine body 1 and the bypass valve 39 is fully opened so as to stop boosting by the supercharger 33.

(b) Second Operating Range B

Within a range in which the engine load is high, it is difficult to increase the air-fuel ratio of the mixture gas (make the ratio lean) due to a large amount of fuel supplied to the combustion chamber 6. As a result, within the second operating range B in which the engine load is greater than within the first operating range A, the air-fuel ratio in the combustion chamber 6 is set to less than or equal to the stoichiometric air-fuel ratio, and the mixture gas is subjected to SPCCI combustion. In this embodiment, within the second operating range B, the air-fuel ratio of the mixture gas is substantially set to the stoichiometric air-fuel ratio.

Within the second operating range B, the opening of the throttle valve 32 is set such that an air amount corresponding to the engine load is basically introduced into the combustion chamber 6 except during an execution of an abnormal combustion avoidance control described later.

Figure 5:
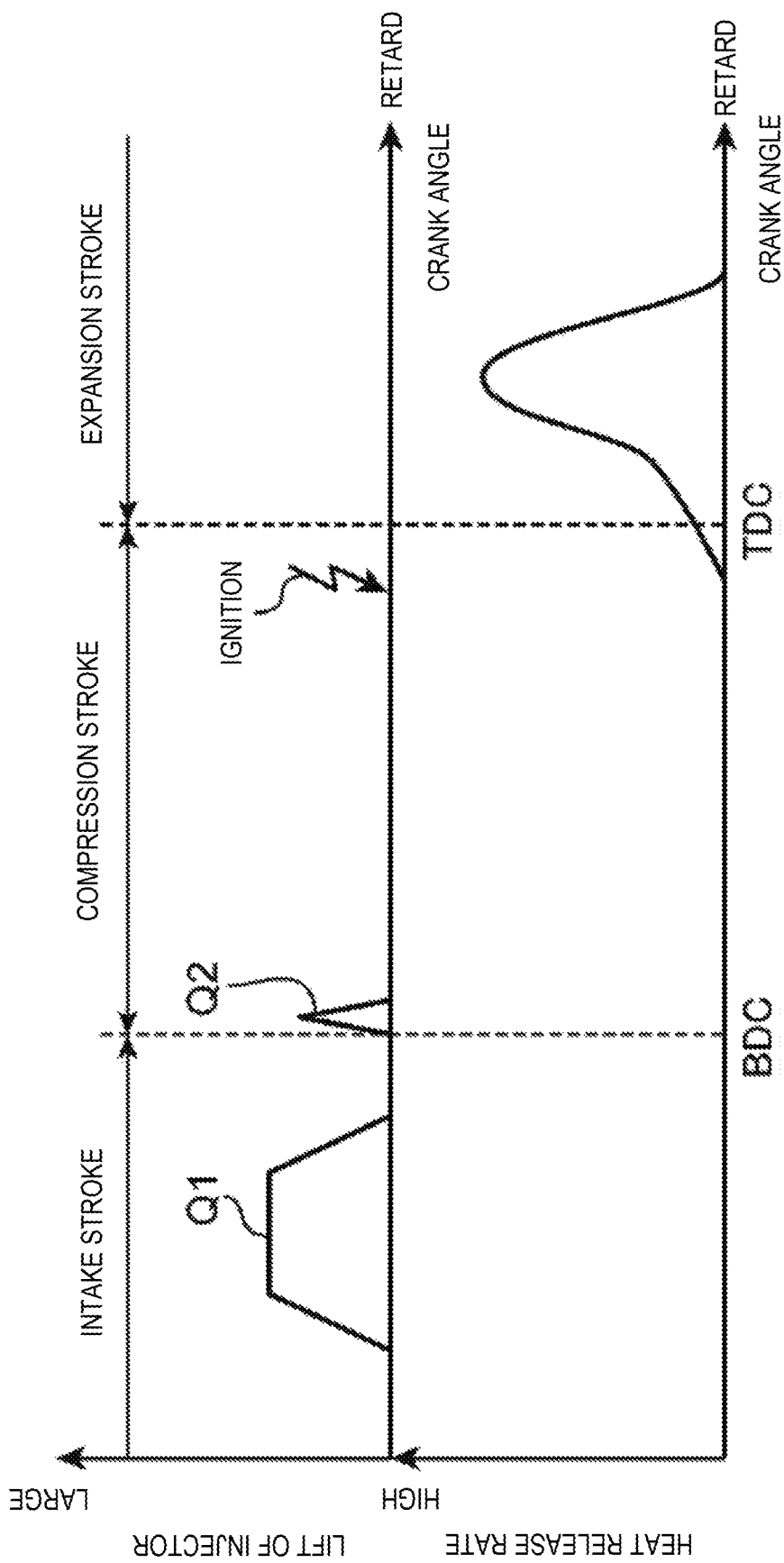
FIG. 5 is a chart illustrating a fuel injection pattern and a waveform of a heat release rate during a normal control within a second operating range.

Within the second operating range B, the injector 15 injects the fuel into the combustion chamber 6 to achieve the stoichiometric air-fuel ratio as described above. In this embodiment, except for when the abnormal combustion avoidance control described later is performed, the injector 15 basically supplies a major portion of the fuel for one combustion cycle into the combustion chamber 6 on the intake stroke, and the remaining fuel from a latter half of the intake stroke until an early half of the compression stroke, similarly to the first operating range A. For example, within the second operating range B, as illustrated in FIG. 5, a first fuel injection (Q1) is started near the center of the intake stroke (e.g., 300° CA before CTDC), and a second fuel injection (Q2) is started near the bottom dead center of intake stroke (180° CA before CTDC). The injection amount of the second fuel injection (a mass of the fuel injected from the injector 15 for the second time) is smaller than the injection amount of the first fuel injection (a mass of the fuel injected from the injector 15 for the first time). For example, the ratio of the injection amount of the second fuel injection to the total amount of fuel injected into the combustion chamber 6 in one combustion cycle is about 10%. Hereinafter, in the case where the injector 15 injects the fuel in the two injections as described above, the first fuel injection may be referred to as the first-stage injection, and the second fuel injection may be referred to as the second-stage injection.

Also within the second operating range B, the ignition plug 16 ignites the mixture gas near CTDC. Further, this ignition triggers the SPCCI combustion, a portion of the mixture gas in the combustion chamber 6 is combusted through flame propagation (SI combustion), and then the remaining mixture gas is combusted by self-ignition (CI combustion).

Within the second operating range B, the EGR valve 53 is opened and the external EGR gas is introduced into the combustion chamber 6 to reduce $NO_x$ generated in the combustion chamber 6. However, when the engine load is high, since a large amount of air needs to be introduced into the combustion chamber 6, the introduction amount of external EGR gas into the combustion chamber 6 is required to be reduced. Thus, within the second operating range B, the opening of the EGR valve 53 is controlled so that the amount of the external EGR gas introduced into the combustion chamber 6 becomes smaller as the engine load increases, and in the range with the highest engine load, the EGR valve 53 is fully closed.

Also within the second operating range B, the intake VVT 13a and the exhaust VVT 14a are driven such that valve overlap period applies.

Within the second operating range B, the swirl valve 18 is opened to an appropriate intermediate which is not the fully closed/opened state, and the opening is increased as the engine load increases.

The supercharger 33 is stopped on the side of the second operating range B where both the engine speed and the engine load are low. On the other hand, in other segment of the second operating range B, the supercharger 33 is operated. That is, the electromagnetic clutch 34 is engaged, and thus, the supercharger 33 and the engine body 1 are connected. Here, the opening of the bypass valve 39 is controlled so that the pressure in the surge tank 36 (boosting pressure) matches a given target pressure determined for each operating condition (engine speed and engine load).

(c) Third Operating Range C

Within the third operating range C, relatively traditional SI combustion is performed. To achieve this SI combustion, within the third operating range C, the injector 15 injects the fuel at least for a given period overlapping with the intake stroke. The ignition plug 16 ignites the mixture gas near CTDC. Within the third operating range C, this ignition triggers the SI combustion, and all the mixture gas in the combustion chamber 6 combusts through flame propagation.

Within the third operating range C, the supercharger 33 is operated. The throttle valve 32 is fully opened. The opening of the EGR valve 53 is controlled to bring the air-fuel ratio in the combustion chamber 6 to the stoichiometric air-fuel ratio or lower. For example, within the third operating range C, the opening of the EGR valve 53 is controlled to bring the air-fuel ratio in the combustion chamber 6 to or slightly less than the stoichiometric air-fuel ratio. Within the third operating range C, the swirl valve 18 is fully opened.

(4) Abnormal Combustion Measures

Within the second operating range B, since the SPCCI combustion is performed and the engine load is high, when the temperature, etc. inside the combustion chamber 6 deviates from a desired level, the in-cylinder pressure may sharply increase over a given range. Specifically, when one of the temperature inside the combustion chamber 6 and the air-fuel ratio of the mixture gas is high, the mixing and reaction of air and fuel is promoted to accelerate the progress of combustion. That is, the combustion starts early or the combustion speed increases. If the progress of the combustion becomes excessively fast, the mixture gas starts self-ignition at an early timing before or immediately after the ignition by the ignition plug 16 and near CTDC, or the combustion speed of the mixture gas after the self-ignition becomes excessively high, and the in-cylinder pressure rises sharply.

If the in-cylinder pressure rises sharply, combustion noise increases. Therefore, in this embodiment, within the second operating range B, whether abnormal combustion of which progress is excessively fast and combustion noise exceeds a desired level has occurred is determined. When such abnormal combustion occurs, a control for avoiding the abnormal combustion from occurring continuously is executed.

(4-1) Abnormal Combustion Determination

The in-cylinder pressure is detected by the in-cylinder pressure sensor SN3. However, the present inventors have discovered that with a configuration in which the abnormal combustion of which noise exceeds a desired level is determined to have occurred simply when the highest value detected by the in-cylinder pressure sensor SN3 is greater than the given value, a sufficient determination accuracy cannot be secured due to a cavernous resonance caused inside the cylinder at the time of combustion of the mixture gas.

Figure 6A:
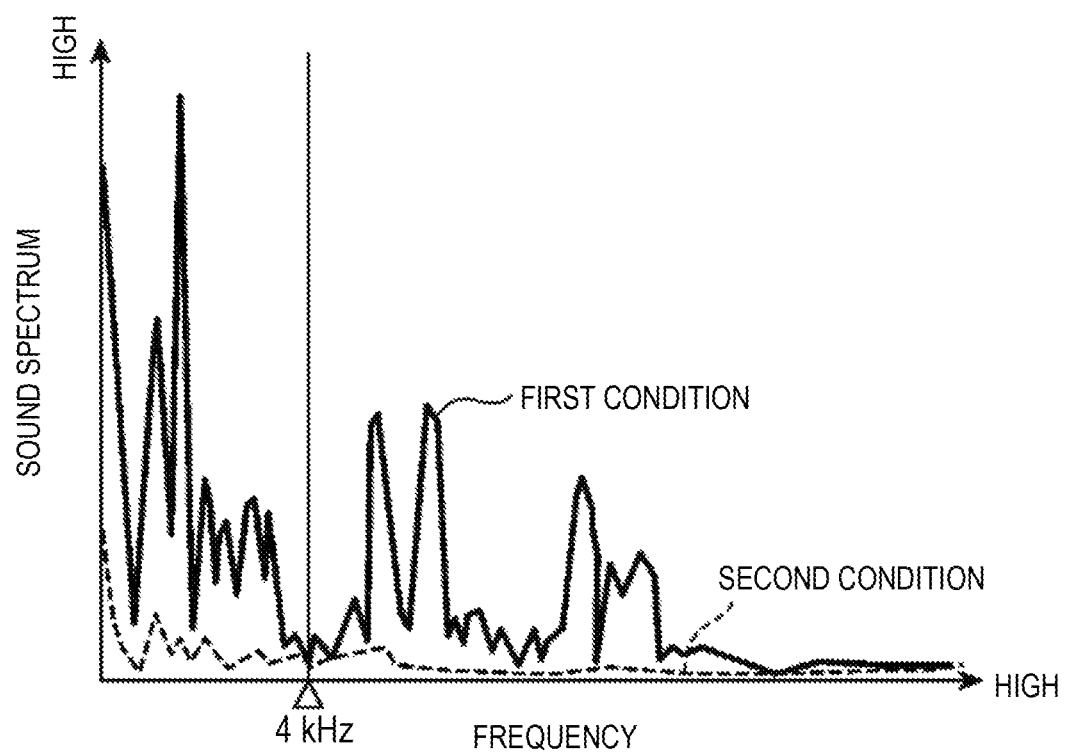
FIGS. 6A and 6B are charts illustrating a relationship between a frequency and a spectrum, where
Figure 6B:
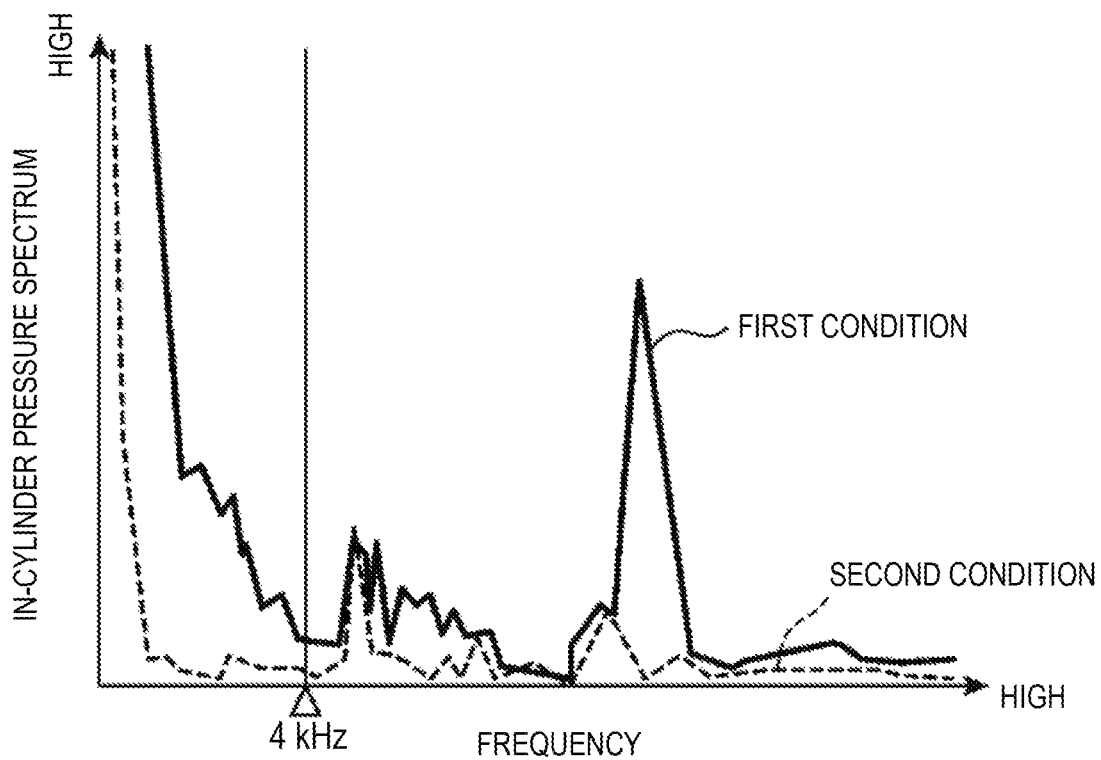

FIG. 6A illustrates a result of a frequency analysis of sound collected by a microphone around the engine body 1 when the engine body 1 is operated under a first condition and a second condition in which the operating condition of the engine is different from each other. FIG. 6B illustrates a result of the frequency analysis of the in-cylinder pressure detected by the in-cylinder pressure sensor in the same state as FIG. 6A. In FIGS. 6A and 6B, a horizontal axis indicates the frequency and a vertical axis indicates the spectrum, and a solid line indicates the result under the first condition and a broken line indicates the result under the second condition.

As illustrated in FIG. 6A, the spectrum of the sound under the first condition is larger than that under the second condition, and the noise is louder under the first condition than under the second condition. On the other hand, as illustrated in FIG. 6B, within the range in which the frequency is below 4 kHz, the spectrum of the in-cylinder pressure is clearly larger under the first condition than under the second condition, whereas within the range in which the frequency is 4 kHz or higher, the in-cylinder pressure spectrum is not different between the first condition and the second condition except for some frequencies. As described above, the spectrum (i.e., the intensity and magnitude) of the in-cylinder pressure of the low-frequency component have a high correlation with the noise, whereas the spectrum of the in-cylinder pressure of the high-frequency component has a low correlation with the noise.

The high-frequency component of the in-cylinder pressure waveform forms a wave generated by the cavernous resonance in the combustion chamber 6. Therefore, the pressure wave of the in-cylinder pressure of the high-frequency component has a node section and an antinode section inside the combustion chamber 6.

Figure 7A:
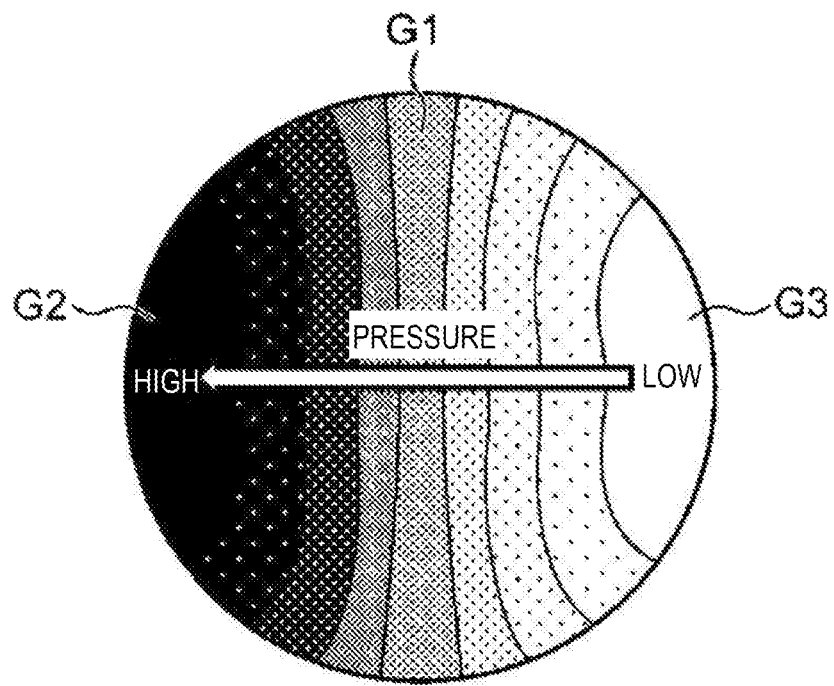
FIGS. 7A and 7B are diagrams schematically illustrating a spectrum distribution of the in-cylinder pressure of 7 kHz generated in a combustion chamber by cavernous resonance, at different timings in the combustion chamber.
Figure 7B:
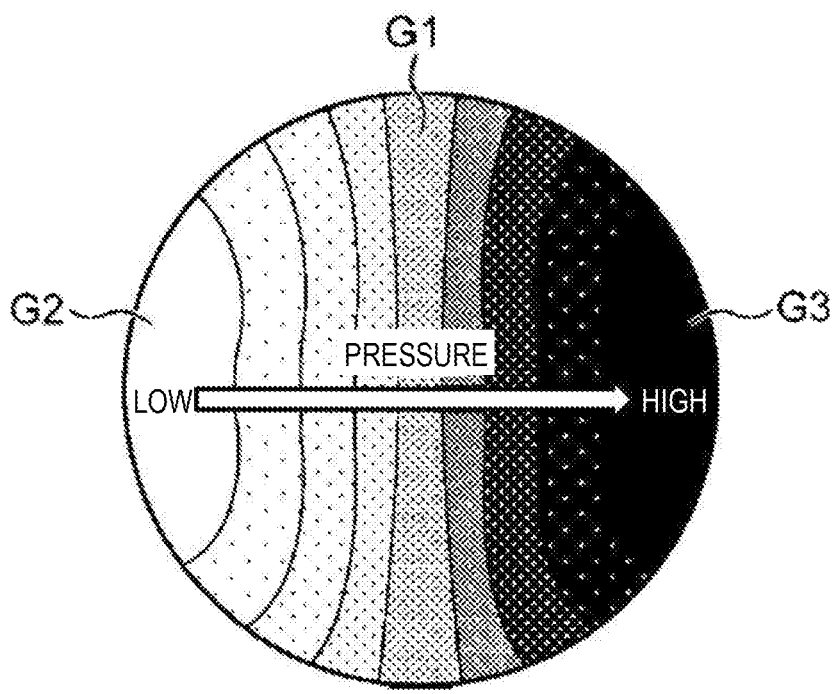

FIGS. 7A and 7B are schematic cross-sectional views of the combustion chamber 6, illustrating a spectrum distribution of the in-cylinder pressure at 7 kHz generated by the cavernous resonance. FIGS. 7A and 7B illustrate the distributions at different given timings during combustion. In each of the examples of FIGS. 7A and 7B, a center portion G1 in left-and-right directions of the drawing becomes the node of the pressure wave of 7 kHz, and a right end portion G3 and a left end portion G2 of the combustion chamber 6 respectively become an antinode of the pressure wave of 7 kHz. Thus, as illustrated in FIG. 7A, the spectrum at the left end portion G2 of the combustion chamber 6 reaches its highest pressure and the spectrum at the right end portion G3 reaches its lowest pressure at a given timing, whereas as illustrated in FIG. 7B, the spectrum at the left end portion G2 of the combustion chamber 6 reaches its lowest pressure and the spectrum at the right end portion G3 reaches its highest pressure at a deviated timing from the given timing. As described above, the spectrum of the in-cylinder pressure of the obtained high-frequency component significantly changes depending on the position in the combustion chamber 6, and the spectrum of the in-cylinder pressure of the high-frequency component significantly changes depending on the installation position of the in-cylinder pressure sensor, which is where the in-cylinder pressure used for the spectrum calculation is detected. Moreover, even at the same frequency component, the positions of node and antinode of the pressure wave change depending on the engine speed, etc.

In this manner, as described above, the phenomenon in which the correlation between the spectrum (i.e., the intensity and magnitude) of the in-cylinder pressure of the high-frequency component and the noise cannot be secured occurs, and with the configuration in which whether the abnormal combustion causing excessive noise has occurred is determined simply based on the highest value of the in-cylinder pressure, the determination accuracy degrades.

On the other hand, since the pressure wave of the in-cylinder pressure of the low-frequency component is barely affected by the cavernous resonance, the average magnitude of the in-cylinder pressure is detected regardless of the installation position of the in-cylinder pressure sensor. Thus, the correlation between the spectrum of the in-cylinder pressure of the low-frequency component and the noise increases as described above.

Based on the above knowledge, in this embodiment, whether the abnormal combustion has occurred is determined simply using the low-frequency component of the in-cylinder pressure detected by the in-cylinder pressure sensor SN3.

Figure 8:
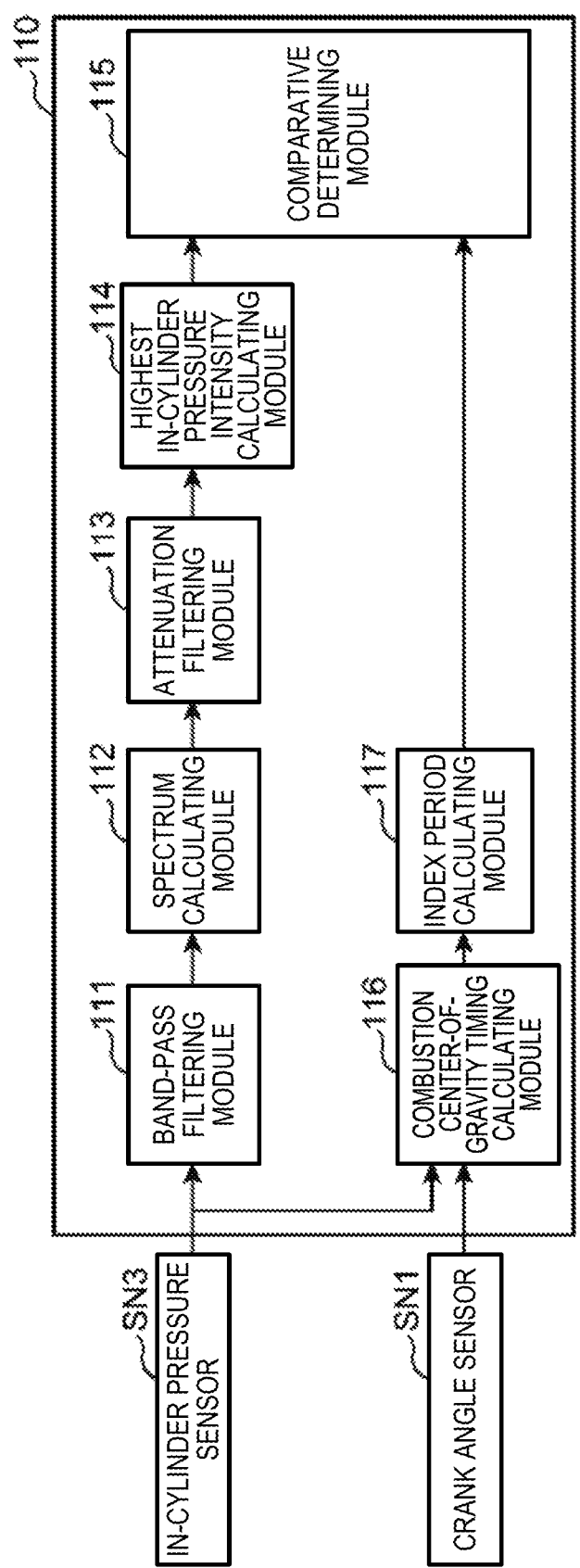
FIG. 8 is a block diagram illustrating a flow of an abnormal combustion determination.

The determination as to whether the abnormal combustion has occurred is performed by the abnormal combustion determining module 110. FIG. 8 is a block diagram illustrating a flow of the abnormal combustion determination performed by the abnormal combustion determining module 110. The abnormal combustion determining module 110 comprises a band-pass filtering module 111, a spectrum calculating module 112, an attenuation filtering module 113, a highest in-cylinder pressure intensity calculating module 114, a comparative determining module 115, a combustion center-of-gravity timing calculating module 116, and an index period calculating module 117.

The band-pass filtering module 111 is an example of a "filtering module" in the present disclosure, the highest in-cylinder pressure intensity calculating module 114 is an example of an "intensity calculating module" in the present disclosure, and the comparative determining module 115 is an example of a "determining module" in the present disclosure.

The band-pass filtering module 111 extracts merely the low-frequency component from the in-cylinder pressure detected by the in-cylinder pressure sensor SN3. In this embodiment, the frequency components less than a first frequency and greater than a second frequency are extracted from the in-cylinder pressure detected by the in-cylinder pressure sensor SN3. The first frequency is set near the highest value of the in-cylinder pressure frequency which is not affected by the cavernous resonance. The second frequency is set near the highest value of the frequency of the waveform of the in-cylinder pressure which is not caused by combustion, that is, the in-cylinder pressure generated by the reciprocating motion of the piston 5. For example, the first frequency is set to 4 kHz, and the second frequency is set to 1 kHz. Note that sounds of a frequency greater than 4 kHz are relatively difficult to be perceived by a human ear. Therefore, when the first frequency is set to 4 kHz, the correlation between the noise detected by a person and the level of the in-cylinder pressure is secured. The first frequency is an example of a "reference frequency" in the present disclosure, and the second frequency is an example of a "second reference frequency" in the present disclosure.

The spectrum calculating module 112 performs a Fourier analysis on the low-frequency component of the in-cylinder pressure extracted by the band-pass filtering module 111 to calculate the spectrum of each frequency (within the range from the second frequency to the first frequency). Note that processing of eliminating a pressure change caused by driving the ignition plug 16, that is, an ignition noise, from the low-frequency component of the in-cylinder pressure extracted by the band-pass filtering module 111 may be performed before the Fourier analysis is performed by the spectrum calculating module 112.

Figure 9:
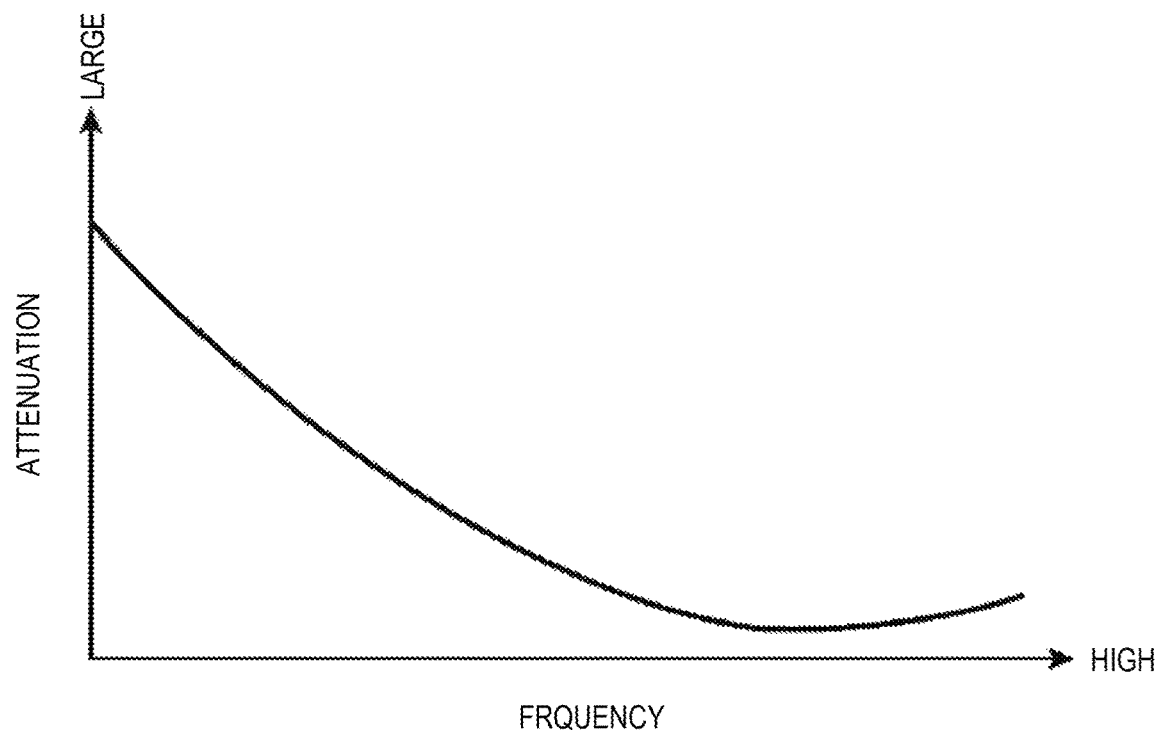
FIG. 9 is a chart illustrating an example of an attenuation filter.

The attenuation filtering module 113 applies an attenuation filter to the spectrum calculated by the spectrum calculating module 112. That is, part of the pressure wave generated in the combustion chamber 6 is attenuated by the cylinder block 3, etc., and the level of sound transmitted outside the engine body 1 as noise is reduced. The attenuation filtering module 113 applies an attenuation filter simulating such attenuation, to the spectrum calculated by the spectrum calculating module 112. In this embodiment, the attenuation filtering module 113 subtracts an attenuation amount set for each frequency as illustrated in FIG. 9, from the spectrum of the corresponding frequency calculated by the spectrum calculating module 112. Specifically, the attenuation filter in FIG. 9 is set such that the attenuation amount decreases as the frequency increases toward the first frequency. The spectrum of each frequency calculated by the spectrum calculating module 112 is subtracted less as the frequency is higher.

The highest in-cylinder pressure intensity calculating module 114 calculates, as a highest in-cylinder pressure intensity CPLF, the highest value of the spectrum of the in-cylinder pressure waveform from the second frequency to the first frequency (greater than the second frequency and less than the first frequency) after being processed by the attenuation filtering module 113. In this embodiment, the spectrum of the in-cylinder pressure processed by the attenuation filtering module 113 is subjected to a ⅓ octave band processing, the spectrum of each band is calculated, and then the highest value of the spectrum of all bands is extracted. The ⅓ octave band processing is processing of dividing each octave range (a range from a certain frequency to a frequency twice thereof) of the frequency spectrum into three and calculating an in-cylinder pressure level of each divided band. For example, spectrums of bands having 1 kHz, 1.25 kHz, 1.6 kHz, 2 kHz, 2.5 kHz, 3.15 kHz, and 4 kHz as their respective center frequencies are specified by the ⅓ octave bank processing. In this manner, in this embodiment, the highest value of the spectrum of the in-cylinder pressure of the low-frequency component after being attenuated by the cylinder block 3, etc. is calculated. Note that the highest in-cylinder pressure intensity CPLF is an example of an "in-cylinder pressure intensity" in the present disclosure.

The comparative determining module 115 compares the highest in-cylinder pressure intensity CPLF calculated by the highest in-cylinder pressure intensity calculating module 114, to a given determination intensity. Then, when the highest in-cylinder pressure intensity CPLF exceeds the determination intensity, the comparative determining module 115 determines that the abnormal combustion has occurred in which the progress of combustion is excessively fast and combustion noise exceeds the desired level. The highest in-cylinder pressure intensity CPLF when such an abnormal combustion has occurred is known to be greater than or equal to 80 dB. Thus, the determination intensity is set to 80 dB. In other words, in this embodiment, combustion with the highest in-cylinder pressure intensity CPLF of less than 80 dB is defined as normal combustion, and combustion with the highest in-cylinder pressure intensity CPLF of 80 dB or higher is defined as abnormal combustion.

Figure 10:
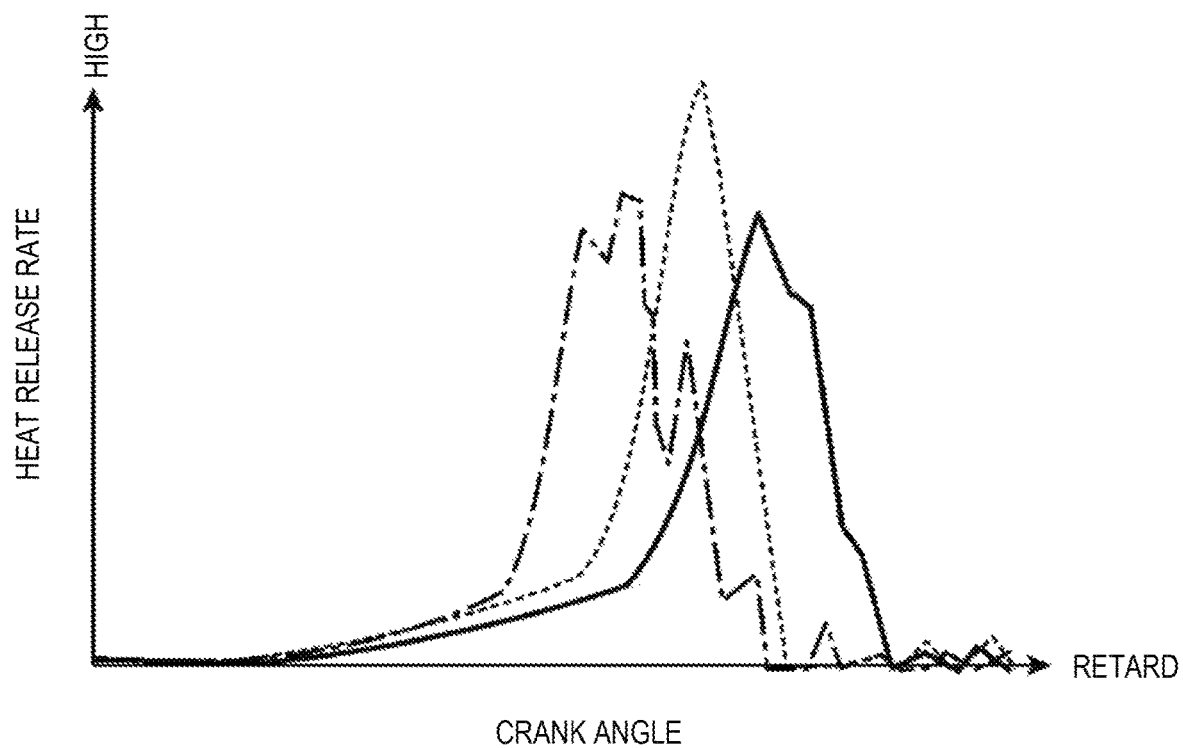
FIG. 10 is a chart illustrating a change in a heat release rate with respect to a crank angle.

FIG. 10 illustrates the heat release rate (solid line) when the normal combustion is achieved and the heat release rate (dashed line and chain line) when the abnormal combustion in which the highest in-cylinder pressure intensity CPLF is greater than or equal to 80 dB has occurred, in comparison with each other. As illustrated in FIG. 10, in the abnormal combustion, the combustion starts earlier and proceeds faster than the normal combustion. However, even when the highest in-cylinder pressure intensity CPLF is similarly greater than or equal to 80 dB, the timing when the heat release rate sharply rises, that is, the timing when the CI combustion starts, is not constant as indicated by the dashed line and the chain line of FIG. 10.

In the combustion in which the CI combustion starts at a relatively late timing as indicated by the dashed line, the progress of the combustion of the mixture gas is slowed by changing the ignition timing. Specifically, the combustion speed can be reduced by retarding the ignition timing and causing a main combustion at a late timing of expansion stroke. On the other hand, in the combustion in which the CI combustion starts relatively early as indicated by the chain line, the progress of the combustion of the mixture gas cannot be changed even if the ignition timing is changed. In other words, in the combustion indicated by the chain line, since the reaction between fuel and air sufficiently progresses by the ignition timing, even if the ignition timing is changed, the progress of the combustion of the mixture gas cannot be changed, and the mixture gas self-ignites early regardless of the ignition timing.

Accordingly, when the abnormal combustion determining module 110 determines that the abnormal combustion has occurred in which the highest in-cylinder pressure intensity CPLF is greater than or equal to the given determination intensity, the abnormal combustion determining module 110 further determines the pattern of the abnormal combustion from the patterns described above. That is, the comparative determining module 115 determines whether the abnormal combustion occurring when the highest in-cylinder pressure intensity CPLF is greater than or equal to the given determination intensity, is a first abnormal combustion which the progress of the combustion of the mixture gas is changeable by changing the ignition timing, or a second abnormal combustion which the progress of the combustion of the mixture gas cannot change by changing the ignition timing. Hereinafter, the first abnormal combustion is referred to as "knocking," and the second abnormal combustion is referred to as a "pre-ignition" as appropriate.

Figure 11:
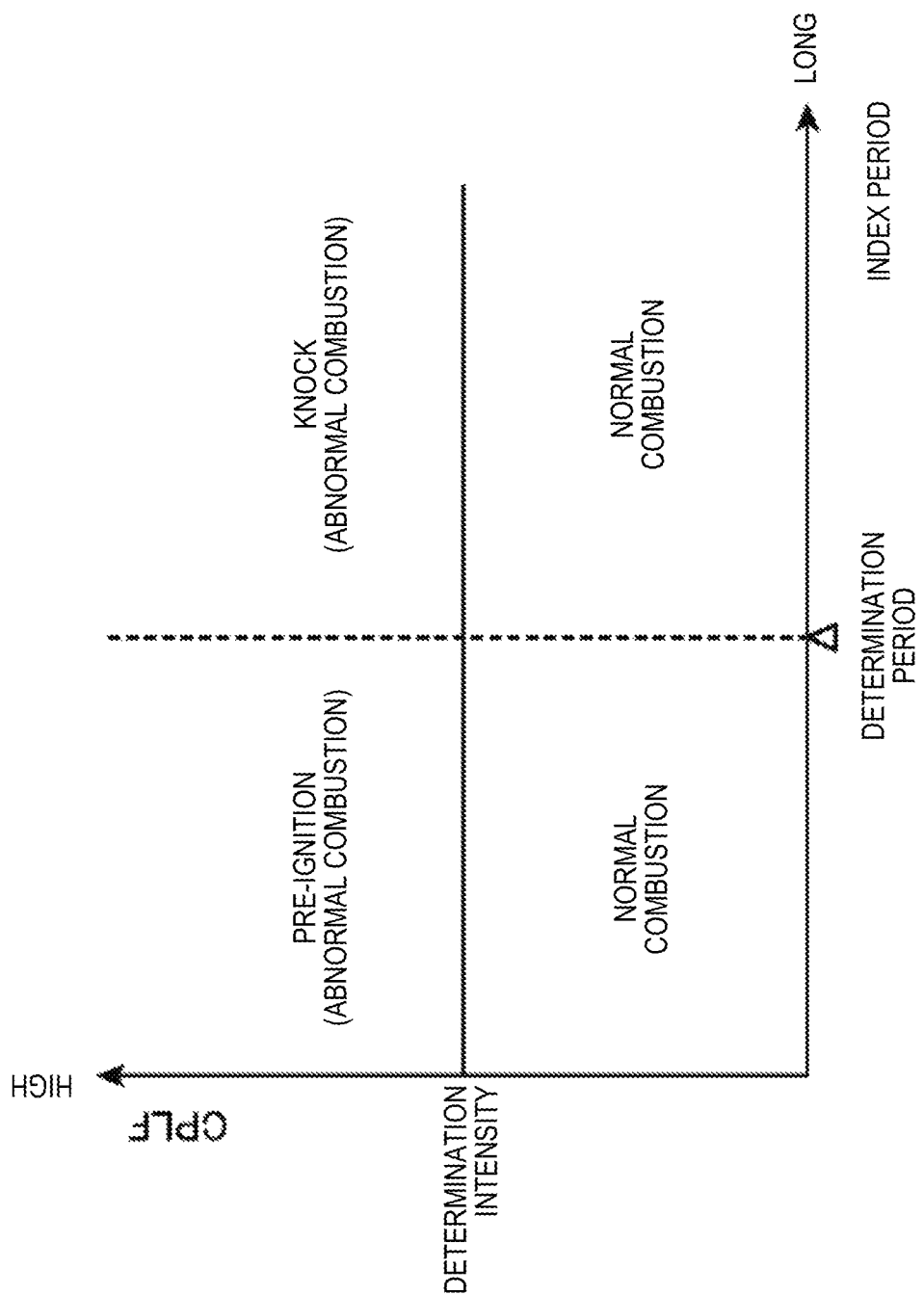
FIG. 11 is a map illustrating the flow of the abnormal combustion determination.

In this embodiment, as illustrated in FIG. 11, in the case where the abnormal combustion determining module 110 determines that the abnormal combustion in which the highest in-cylinder pressure intensity CPLF is greater than or equal to the given determination intensity has occurred, the abnormal combustion is determined as the pre-ignition when an index period from the ignition timing to a combustion center-of-gravity timing is shorter than a given determination period, and the abnormal combustion is determined as knocking when the index period from the ignition timing to the combustion center-of-gravity timing is the determination period or longer. The combustion center-of-gravity timing is a timing when 50% of the total amount (mass) of fuel supplied to the combustion chamber 6 in one combustion cycle ends combusting. In this embodiment, 50% of the total amount (mass) of fuel is an example of a "given rate of the total fuel supplied to the cylinder in one combustion cycle" in the present disclosure.

The combustion center-of-gravity timing calculating module 116 calculates heat release rates at respective crank angles based on the in-cylinder pressure, which is the detected value by the in-cylinder pressure sensor SN3, the crank angle detected by the crank angle sensor SN1, and the volume of the combustion chamber 6 at the corresponding crank angle stored in the ECU 100. The combustion center-of-gravity timing calculating module 116 integrates the calculated heat release rates to calculate a heat release amount. Further, as illustrated in FIG. 4, with the heat release amount at a given crank angle being 100%, a crank angle at which 50% of the heat release amount is generated is calculated as the combustion center-of-gravity timing.

The index period calculating module 117 calculates a period from the ignition timing (a command value of the ignition timing issued by the ECU 100 to the ignition plug 16) to the combustion center-of-gravity timing calculated by the combustion center-of-gravity timing calculating module 116, as an index period.

The comparative determining module 115 compares the index period calculated by the index period calculating module 117 to the determination period. In the case where the abnormal combustion in which the highest in-cylinder pressure intensity CPLF is greater than or equal to the given determination intensity is determined to have occurred, the comparative determining module 115 determines that the pre-ignition has occurred when the index period is shorter than the determination period.

Further, when the combustion cycle in which the highest in-cylinder pressure intensity CPLF is greater than or equal to the given determination intensity and the index period is shorter than the determination period occurs continuously greater than or equal to a given number of times (determination threshold number of times) set for one cylinder 2, the comparative determining module 115 determines that the pre-ignition has occurred. That is, in this embodiment, when a combustion cycle in which the highest in-cylinder pressure intensity CPLF is greater than or equal to the given determination intensity and the index period is shorter than the determination period simply occurs, this does not cause the pre-ignition to be determined to have occurred. The pre-ignition is only determined to have occurred only when such a combustion cycle occurs continuously for the determination threshold number of times or more. The determination period and the determination threshold number of times are set in advance and stored in the comparative determining module 115. For example, the determination threshold number of times is set to two. The pre-ignition is known to occur when the index period is less than 10° CA. Thus, the determination period is set to 10° CA.

Figure 12:
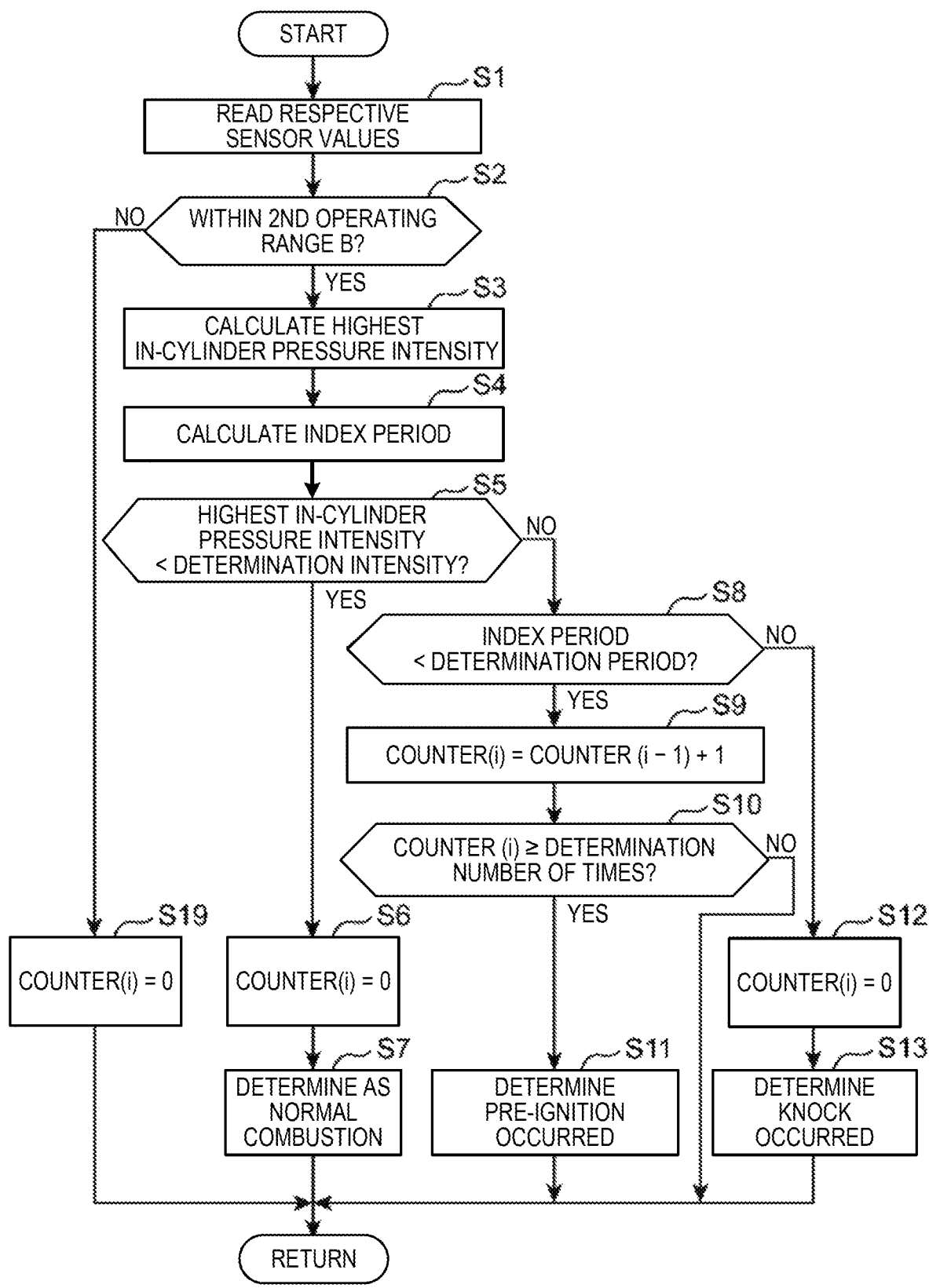
FIG. 12 is a flowchart illustrating the flow of the abnormal combustion determination.

As follows, the flowchart of FIG. 12 summarizes the procedure of the abnormal combustion determination as described above. Each of Steps S1 to S19 illustrated in FIG. 12 is performed every time the combustion ends for each cylinder 2.

At Step S1, the abnormal combustion determining module 110 reads the in-cylinder pressure detected by in-cylinder pressure sensor SN3, etc.

Next, at Step S2, the abnormal combustion determining module 110 determines whether a current operation point of the engine is within the second operating range B.

If the determination at Step S2 is NO and the current operation point is outside the second operating range B, the flow proceeds to Step S19. At Step S19, the abnormal combustion determining module 110 sets a counter (i) to 0. The counter will be described later.

On the other hand, if the determination at Step S2 is YES and the current operation point is within the second operating range B, that is, if the engine is operated within the second operating range B, the flow proceeds to Step S3.

At Step S3, the abnormal combustion determining module 110 calculates the highest in-cylinder pressure intensity CPLF as described above, based on the in-cylinder pressure detected by in-cylinder pressure sensor SN3. After Step S3, the flow proceeds to Step S4.

At Step S4, the abnormal combustion determining module 110 calculates the index period, that is, the period from the ignition timing to the combustion center-of-gravity timing as described above, based on the in-cylinder pressure and the crank angle. After Step S4, the flow proceeds to Step S5.

At Step S5, the abnormal combustion determining module 110 determines whether the highest in-cylinder pressure intensity CPLF calculated at Step S3 is less than the determination intensity.

If the determination at Step S5 is YES and the highest in-cylinder pressure intensity CPLF is less than the determination intensity, the flow proceeds to Step S6. At Step S6, the abnormal combustion determining module 110 sets the counter (i) to 0, proceeds to Step S7 to determine that the normal combustion is performed, and ends the flow (returns to Step S1).

On the other hand, if the determination at Step S5 is NO and the highest in-cylinder pressure intensity CPLF is greater than or equal to the given determination intensity, the flow proceeds to Step S8. At Step S8, the abnormal combustion determining module 110 determines whether the index period calculated at Step S4 is shorter than the determination period.

If the determination at Step S8 is YES and the index period is shorter than the determination period, the flow proceeds to Step S9. At Step S9, the abnormal combustion determining module 110 sets the counter (i) to a value obtained by adding 1 to a counter (i−1) calculated in the calculation cycle before the latest cycle. After Step S9, the flow proceeds to Step S10.

At Step S10, the abnormal combustion determining module 110 determines whether the counter (i) is greater than or equal to the determination threshold. If the determination at Step S10 is NO and the counter (i) is less than the determination threshold, the abnormal combustion determining module 110 ends the flow as it is (returns to Step S1).

On the other hand, if the determination at Step S10 is YES and the counter (i) is greater than or equal to the determination threshold, the flow proceeds to Step S11 where the abnormal combustion determining module 110 determines that the pre-ignition has occurred.

As described above, the counter is a parameter representing the number of times that the combustion cycles continuously occurs, in which a condition that the highest in-cylinder pressure intensity CPLF is greater than or equal to the determination intensity and the index period is shorter than the determination period is satisfied in one cylinder. Thus, as described above, this counter becomes zero when the engine is not operated within the second operating range B, or when the above-described condition is not satisfied even though the engine is operated within the second operating range B. Then, in this embodiment, when this condition is continuously satisfied for at least the determination threshold number of times in one cylinder 2, the pre-ignition is determined to have occurred as described above.

Returning to Step S8, if the determination at Step S8 is NO and the index period is longer than or equal to the determination period, the flow proceeds to Step S12 where the abnormal combustion determining module 110 sets the counter (i) to 0. After Step S12, the flow proceeds to Step S13. At Step S13, the abnormal combustion determining module 110 determines that knocking has occurred, and ends the flow (returns to Step S1).

(4-2) Abnormal Combustion Avoidance Control

Next, the abnormal combustion avoidance control which is a control for avoiding the abnormal combustion when the abnormal combustion is occurring continuously, will be described. This abnormal combustion avoidance control is executed by the abnormal combustion avoidance controlling module 120.

(a) Knocking Avoidance Control

When the abnormal combustion determining module 110 determines that knocking has occurred, the abnormal combustion avoidance controlling module 120 retards the ignition timing. Specifically, when knocking is determined to have occurred, the abnormal combustion avoidance controlling module 120 retards the ignition timing of the next combustion cycle by a given period from the ignition timing for the current combustion cycle. Note that at the time of knocking determination, the fuel injection pattern is controlled similarly to the case during the normal control and in which the highest in-cylinder pressure intensity CPLF is less than the determination intensity.

(b) Pre-Ignition Avoidance Control

When the abnormal combustion determining module 110 determines that the pre-ignition has occurred, the abnormal combustion avoidance controlling module 120 retards the fuel injection execution timing and switches the fuel injection pattern to a different pattern from during the normal control.

As described above, during the normal control, the injector 15 performs the first-stage injection (Q1) during the intake stroke, and the second-stage injection (Q2) from the latter half of the intake stroke to the early half of the compression stroke. On the other hand, in the pre-ignition determination, the abnormal combustion avoidance controlling module 120 drives the injector 15 to inject the fuel dividedly in two injections similarly to the case of the normal control, and to retard the execution timings of the first and second stage injections later than during the normal control.

Figure 13:
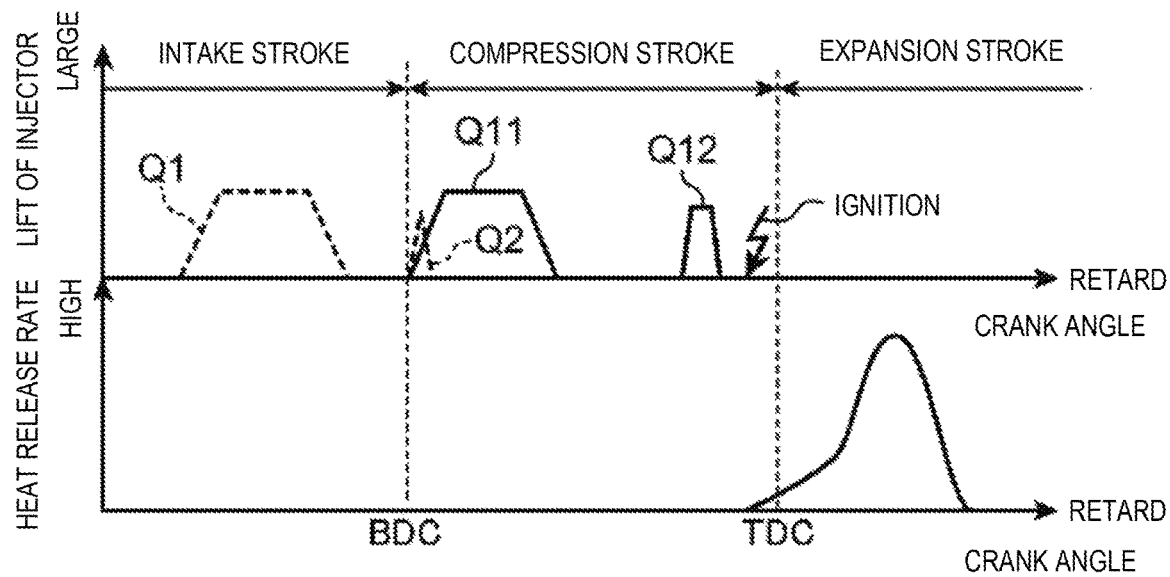
FIG. 13 is a chart illustrating a fuel injection pattern and a waveform of a heat release rate in the pre-ignition determination.
Figure 14:
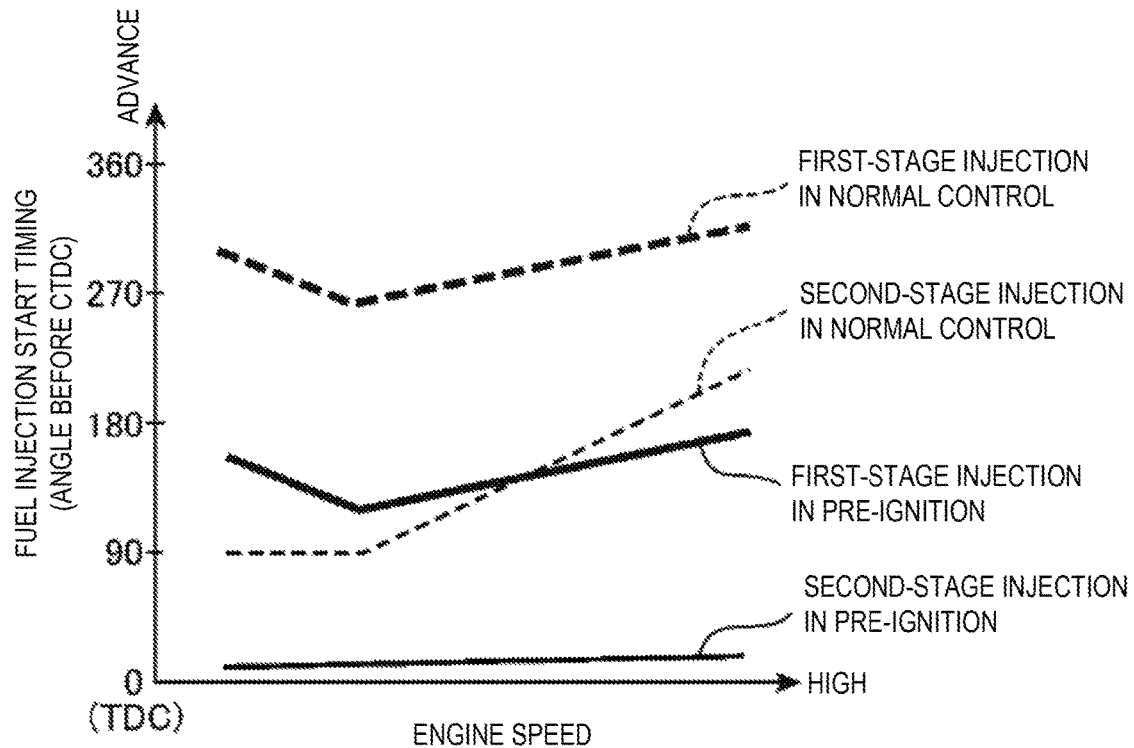
FIG. 14 is a chart illustrating a relationship between start timings of a first-stage injection and a second-stage injection and the engine speed in comparison between the time of the normal control and the time of the pre-ignition determination.

As illustrated by the dashed line in FIG. 13 and as described above, in the normal control, within the second operating range B, the first-stage injection (Q1) is started during the intake stroke, and the second-stage injection (Q2) is started from the latter half of the intake stroke until the early half of the compression stroke. On the other hand, as illustrated by the solid line in FIG. 13, during the pre-ignition determination, a first-stage injection (Q11) starts in the early half of the compression stroke (180° CA before CTDC to 90° CA before CTDC), a second-stage injection (Q12) is started in the latter half of the compression stroke (90° CA before CTDC to CTDC). Further, the start timing of the first-stage injection (Q11) is more retarded than the close timing IVC of the intake valve 11. For example, during the pre-ignition determination, the first-stage injection (Q11) is started at 180° CA before CTDC, and the second-stage injection (Q12) is started about 10 to 20° CA before CTDC. Further, with respect to the engine speed, the start timings of the first-stage injection (Q1) and the second-stage injection (Q2) during the normal control are set as indicated by dashed lines in FIG. 14 and the start timings of these injections (Q11 and Q12) during the pre-ignition determination are set as indicated by the solid lines in FIG. 14.

Further, during the pre-ignition determination, the abnormal combustion avoidance controlling module 120 increases the rate of the injection amount of the second-stage injection.

Figure 15:
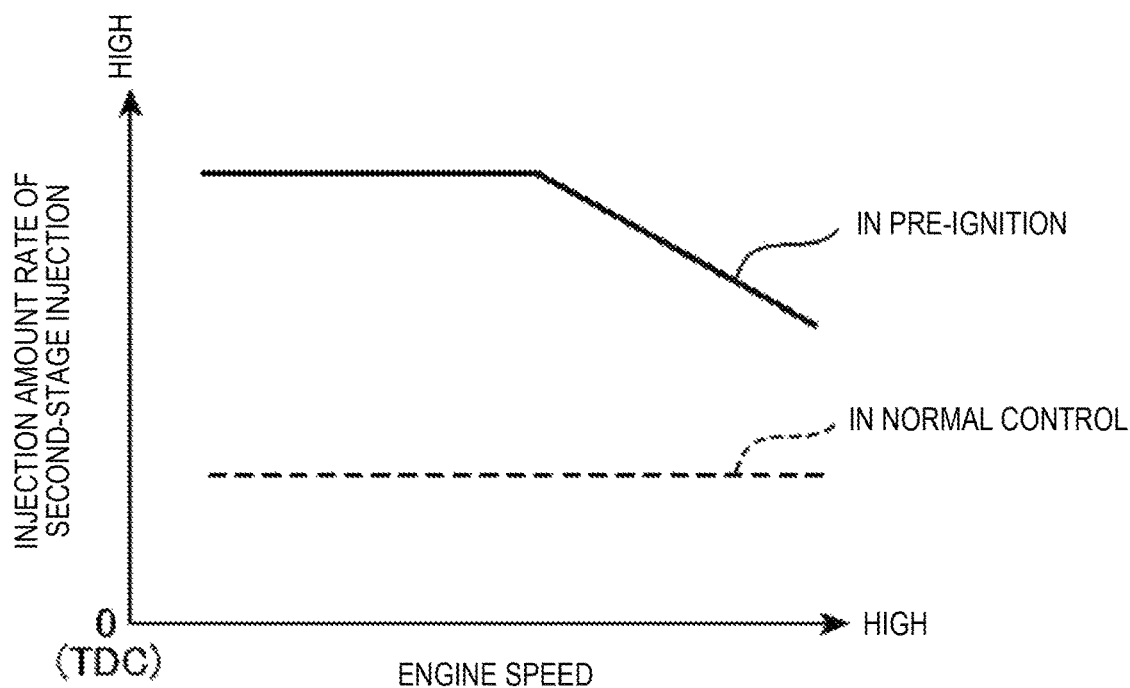
FIG. 15 is a chart illustrating a relationship between an injection amount rate of the second-stage injection and the engine speed in comparison between the time of the normal control and the time of the pre-ignition determination.

Specifically, the rate of the injection amount of the second-stage injection with respect to the total amount of fuel injected into the combustion chamber 6 in one combustion cycle is larger in the pre-ignition determination than in the normal control. For example, the rate of the second-stage injection amount is about 10% during the normal control, and about 20 to 30% during the pre-ignition determination. Further, as indicated by the dashed line in FIG. 15, the rate of the injection amount of the second-stage injection (Q2) during the normal control is maintained constant regardless of the engine speed, whereas, as illustrated by the solid line in FIG. 15, the rate of the injection amount of the second-stage injection (Q12) during the pre-ignition determination is reduced as the engine speed increases. Hereinafter, the fuel injection pattern during the pre-ignition determination may be referred to as the "pre-ignition avoidance pattern."

When the execution timing of the fuel injection is retarded, the mixing period of the fuel and air and the reaction time thereof until reaching near CTDC are shortened, and the reaction of the mixture gas near CTDC slows down. Thus, when the fuel injection pattern is set to the pre-ignition avoidance pattern and the execution timings of the first and second stage injections are retarded, the reaction progresses before the ignition starts, and a situation where a large amount of the mixture gas immediately before self-igniting exists inside the combustion chamber 6 is avoided, and the occurrence of pre-ignition is prevented.

Further, in the pre-ignition avoidance pattern, the first-stage injection is performed at a timing in the early half of the compression stroke and after the intake valve 11 is closed, so that the self-ignition of the mixture gas in an early stage is more reliably prevented. This will be specifically described with reference to FIG. 16, etc.

Figure 16:
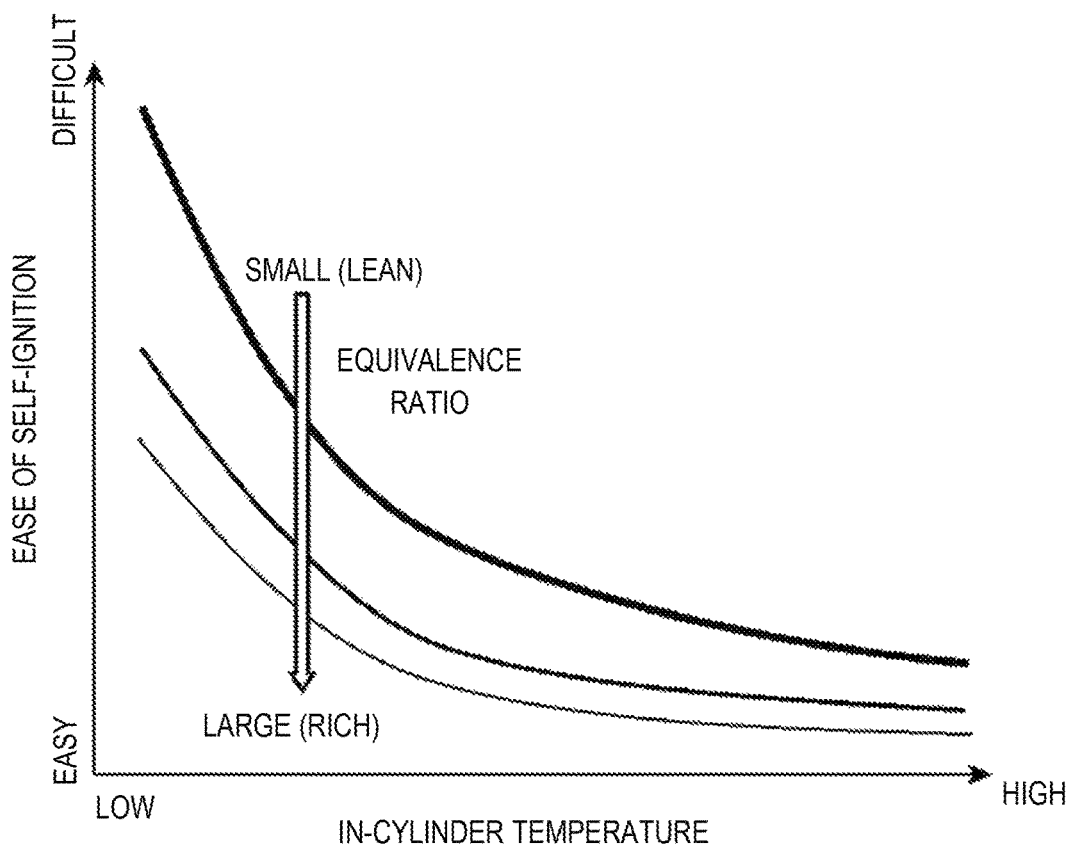
FIG. 16 is a chart illustrating a relationship between the temperature of a mixture gas and an equivalence ratio of the mixture gas with respect to the ease of self-ignition of the mixture gas.

FIG. 16 illustrates a result of examining a relationship between the temperature of the mixture gas and an equivalence ratio of the mixture gas (a value obtained by dividing the stoichiometric air-fuel ratio by the air-fuel ratio), and the ease of self-ignition of the mixture gas. In FIG. 16, the horizontal axis indicates the temperature of the mixture gas, and the vertical axis indicates the ease of self-ignition. Specifically, the vertical axis indicates an amount of OH radicals required for the mixture gas to self-ignite, and when this amount is large and a large amount of OH radicals is required for the mixture gas to self-ignite, the mixture gas can be said to be difficult to self-ignite. The three lines in the chart of FIG. 16 are lines with which the equivalence ratio (air-fuel ratio) of the mixture gas is different from each other, and as the line located lower, the equivalence ratio is larger and the air-fuel ratio is smaller (becomes richer).

As illustrated in FIG. 16, the mixture gas ignites easier as the in-cylinder temperature, i.e., the temperature of the mixture gas, is higher. Here, the temperature inside the combustion chamber 6 becomes higher in its center section than in its outer peripheral section. Thus, the self-ignition of the mixture gas starts first in the center section of the combustion chamber 6. On the other hand, since in this embodiment, the first-stage injection (Q11) and the second-stage injection (Q12) are performed at the above-described timings, the combustion of the mixture gas in the center section of the combustion chamber 6 is prevented from being excessively promoted.

Figure 17A:
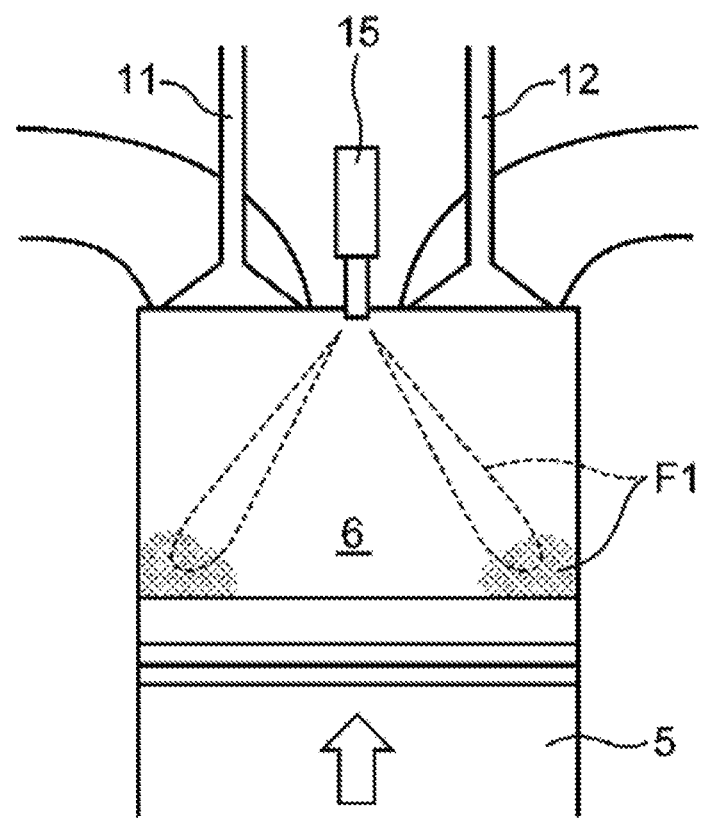
FIGS. 17A and 17B are diagrams illustrating a state of fuel spray when the pre-ignition has occurred, where FIG. 17A indicates immediately after the pre-stage injection and FIG. 17B indicates near a top dead center of compression stroke.
Figure 17B:
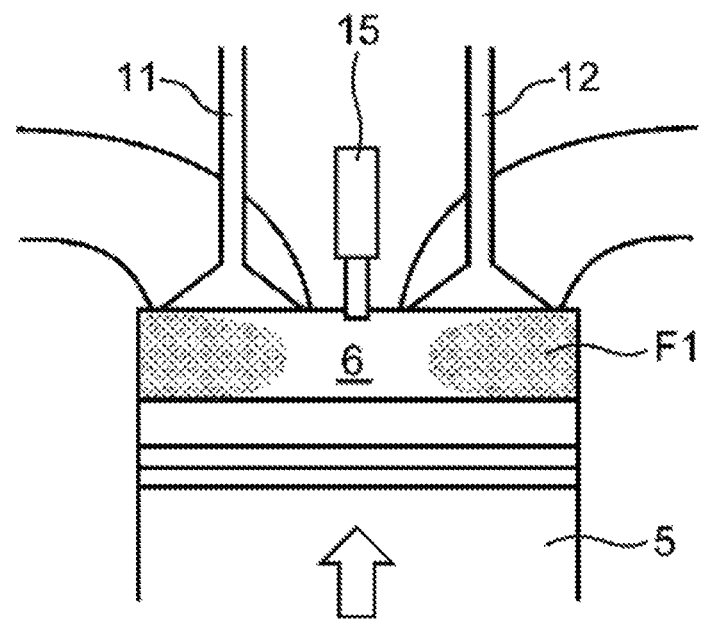

Specifically, in the early half of the compression stroke and after the intake valve 11 is closed, an intake air flow inside the combustion chamber 6 is weak due to the piston 5 rising and the combustion chamber 6 is sealed. Therefore, by performing the first-stage injection (Q11) at the timing in the early half of the compression stroke and after the intake valve 11 is closed, as illustrated in FIG. 17A, the spread of fuel F1 injected in the first-stage injection (Q11) is reduced and a major portion of the fuel F1 remains near an outer circumference of the combustion chamber 6. Then, as illustrated in FIG. 17B, this fuel distribution is substantially maintained until near CTDC. Therefore, the mixing and reaction of the fuel and air related to the first-stage injection (Q11) mainly occur near the outer circumference of the combustion chamber 6, and a temperature increase amount in the vicinity of the center of the combustion chamber 6 due to this reaction is reduced less. Further, the amount of the mixture gas immediately before the self-ignition, which is when the mixture gas is distributed in the center of the combustion chamber 6 near CTDC is reduced small. Accordingly, the timing of the self-ignition of the mixture gas starting in the vicinity of the center of the combustion chamber 6 delays, and the progress of combustion slows down and thus, suppressing the occurrence of pre-ignition. Note that in the normal control, the first-stage injection (Q1) is performed during the intake stroke, therefore the fuel of the first-stage injection spreads throughout the combustion chamber 6.

Here, in the pre-ignition avoidance pattern, the second-stage injection is performed in the latter half of the compression stroke. When the fuel is injected near CTDC in the latter half of the compression stroke, the fuel is supplied to the vicinity of the center of the combustion chamber 6. Further in the pre-ignition avoidance pattern, the rate of the injection amount of the second-stage injection is increased. Thus, in the pre-ignition avoidance pattern, the air-fuel ratio of the mixture gas in the vicinity of the center of the combustion chamber 6 near CTDC decreases (becomes richer), and in the viewpoint of the air-fuel ratio, the mixture gas easily self-ignites in the vicinity of the center of the combustion chamber 6. However, as described above, in the pre-ignition avoidance pattern, the temperature increase amount in the vicinity of the center of the combustion chamber 6 caused by the first-stage injection is reduced smaller. Moreover, as described above, the progress of the reaction between the fuel and the air related to the second-stage injection is not sufficient, which also reduces the temperature increase in the vicinity of the center of the combustion chamber 6. Therefore, the self-ignition of the mixture gas is not excessively promoted near the center of the combustion chamber 6, and the progress of the combustion of the mixture gas slows down.

Figure 18A:
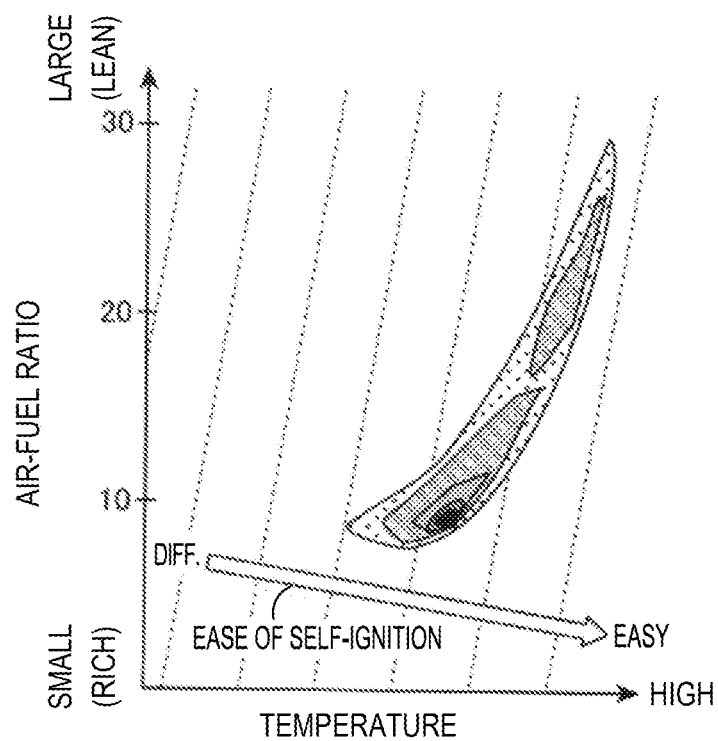
FIGS. 18A and 18B are charts illustrating a distribution of the mixture gas inside the combustion chamber 6 at respective temperatures and air-fuel ratios, where FIG. 18A indicates when the rate of injection is 5% and FIG. 18B indicates when the rate of injection is 30%.
Figure 18B:
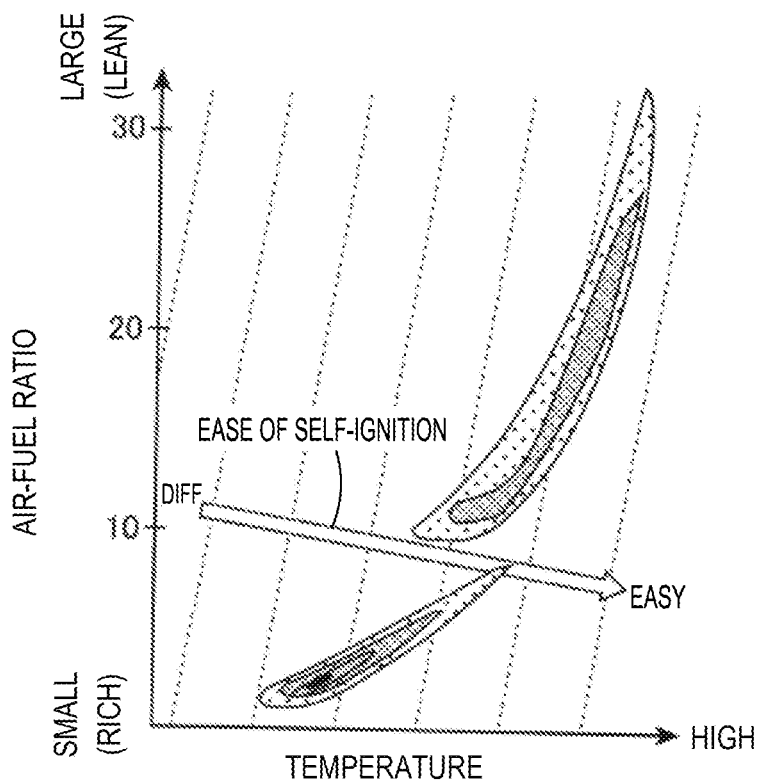

This is also evident from the comparison between FIGS. 18A and 18B. FIGS. 18A and 18B are charts illustrating the distribution of the mixture gas inside the combustion chamber 6 at CTDC, for respective temperatures and air-fuel ratios. In FIGS. 18A and 18B, the darker color indicates that the distribution rate of the mixture gas is higher. Further, FIG. 18A is a chart when the rate of the second-stage injection is 5% (when the rate of the first-stage injection is 95%), and FIG. 18B is a chart when the rate thereof is 30% (when the rate of the first-stage injection is 70%). Each dashed line illustrated in FIGS. 18A and 18B connects a temperature and an air-fuel ratio at which the ease of self-ignition coincides. As illustrated in FIG. 18A, when the rate of the first-stage injection is high and the rate of the second-stage injection is low, the rate of the mixture gas of which air-fuel ratio is relatively large (lean) and having a high temperature, becomes high. On the other hand, as illustrated in FIG. 18B, when the rate of the first-stage injection is lower than in FIG. 18A, and the rate of the second-stage injection is higher than in FIG. 18A, the rate of the mixture gas of which air-fuel ratio is relatively small (rich) and having a low temperature, becomes high. Furthermore, a distribution of mixture gas to the range in which the self-ignition is difficult is larger in the case of FIG. 18B than in the case of FIG. 18A. Therefore, in the pre-ignition avoidance pattern, although the rate of the second-stage injection is increased to form a mixture gas having a high air-fuel ratio in the vicinity of the center of the combustion chamber 6, the mixture gas is difficult to self-ignite and the combustion progress of the mixture gas slows down.

Figure 19:
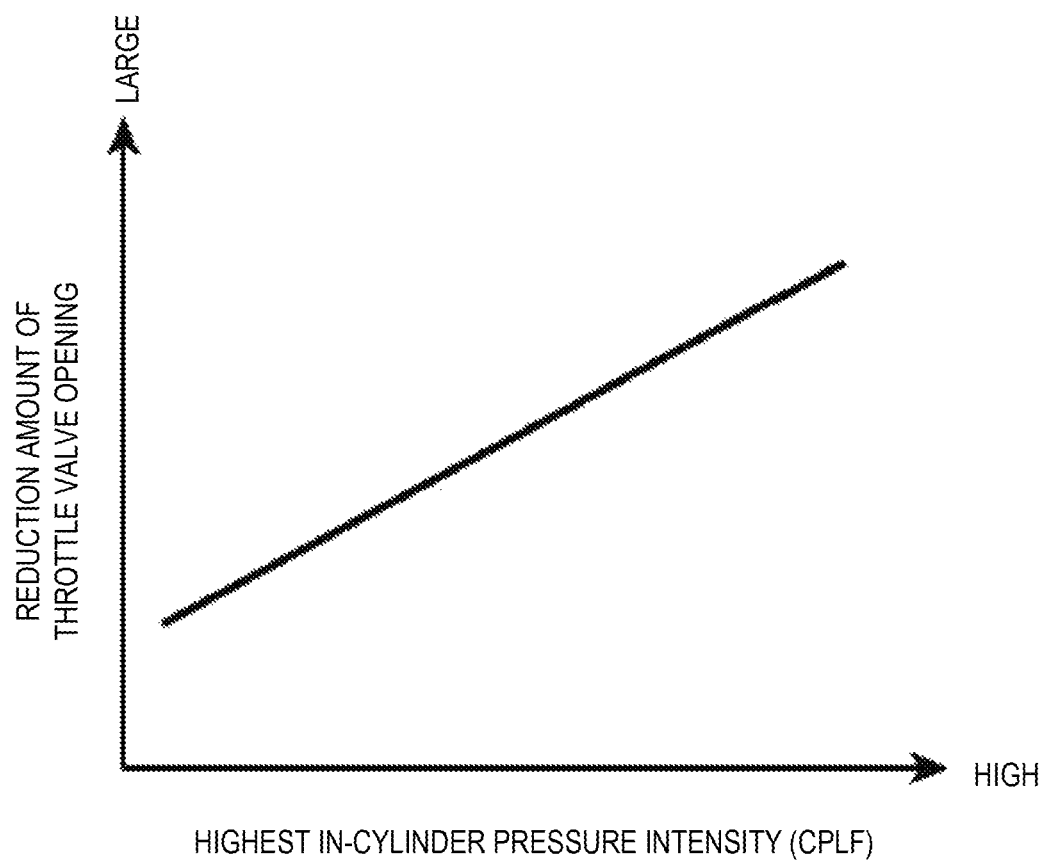
FIG. 19 is a chart illustrating a relationship between a highest in-cylinder pressure intensity and a throttle opening reduction amount when an intake air amount reduction control is executed.

Further, in this embodiment, the abnormal combustion avoidance controlling module 120 reduces the amount of intake air introduced into the combustion chamber 6 at the time of pre-ignition determination and when a given condition described later is satisfied. Specifically, the opening of the throttle valve 32 is reduced (to the closing side). In this embodiment, when the pre-ignition is determined to have occurred in a state where the given condition is satisfied, the opening of the throttle valve 32 is reduced from that immediately before this determination. Moreover, as illustrated in FIG. 19, the abnormal combustion avoidance controlling module 120 increases the reduction amount of the opening of the throttle valve 32 as the highest in-cylinder pressure intensity CPLF increases, and reduces the opening of the throttle valve 32 and increases the reduction amount of the intake air as the highest in-cylinder pressure intensity CPLF increases. When the pre-ignition determination is performed and the given condition is satisfied, the air-fuel ratio of the mixture gas inside the combustion chamber 6 is also maintained close to the stoichiometric air-fuel ratio similarly to during the normal control, and the total amount of fuel supplied to the combustion chamber 6 is reduced, as well as the amount of the intake air. Thus, the heat release amount inside the combustion chamber 6 is reduced and the release of pre-ignition is prevented.

Here, the throttle valve 32 is provided in the intake passage 30 communicating with all the cylinders 2, and when the opening of the throttle valve 32 is changed, the intake air amount is changed for all the cylinders 2. Further, even when the opening of the throttle valve 32 is started to be changed, due to a delay in driving the throttle valve 32 or a delay in transporting gas, the amount of air flowing through the intake passage 30 is reduced only gradually. Therefore, in a case where the pre-ignition is determined to have occurred in a given cylinder 2 and the opening of the throttle valve 32 is reduced and then the pre-ignition is determined to have occurred in another cylinder 2, if the opening of the throttle valve 32 is further reduced, the intake air amount may excessively decrease. For this reason, in this embodiment, from the reduction of the opening of the throttle valve 32 until the combustion is completed in all the cylinders 2, a further change in the opening of the throttle valve 32 is suspended. For example, in a four-cylinder engine, changing the opening of the throttle valve 32 is prohibited for 720° CA after the opening of the throttle valve 32 is reduced.

Reducing the intake air amount and the total amount of fuel reduces the engine torque. Therefore, the control for reducing the intake air amount is executed only when a state where changing the fuel injection pattern alone is difficult to prevent the pre-ignition from occurring.

Specifically, when the highest in-cylinder pressure intensity CPLF is particularly high, changing the fuel injection pattern alone is difficult to prevent the pre-ignition from occurring.

Here, when the operation point of the engine is changed and a given target EGR rate is changed, the amount of EGR gas introduced into the combustion chamber 6 deviates from a target value due to the response delay of the EGR valve 53 or the gas transportation delay. Note that the EGR rate is an amount (mass) of the EGR gas in the combustion chamber 6 with respect to a total amount (mass) of the gas in the combustion chamber 6. When the deviation occurs, the intake air amount introduced into the combustion chamber 6 increases instead of the EGR gas, the air-fuel ratio of the mixture gas increases (becomes lean), and pre-ignition may occur. Otherwise, the amount of the EGR gas introduced into the combustion chamber 6 becomes excessively large and the temperature inside the combustion chamber 6 increases, which may cause the pre-ignition. However, such pre-ignition generated in this manner is eliminated by resolving the response delay of the EGR valve 53 and the gas transportation delay, therefore the necessity of reducing the intake air amount is small.

Accordingly, in this embodiment, in the case where the pre-ignition is determined to have occurred, the intake air amount introduced into the combustion chamber 6 is reduced when an absolute value of a deviation from the target value of the EGR rate is below a given determination value and the highest in-cylinder pressure intensity CPLF is greater than or equal to a reference intensity which is greater than or equal to the given determination intensity. That is, the given condition is set to a condition in which the absolute value of the deviation from the target value of the EGR rate is below the determination value and the highest in-cylinder pressure intensity CPLF is greater than or equal to the reference intensity.

Figure 20:
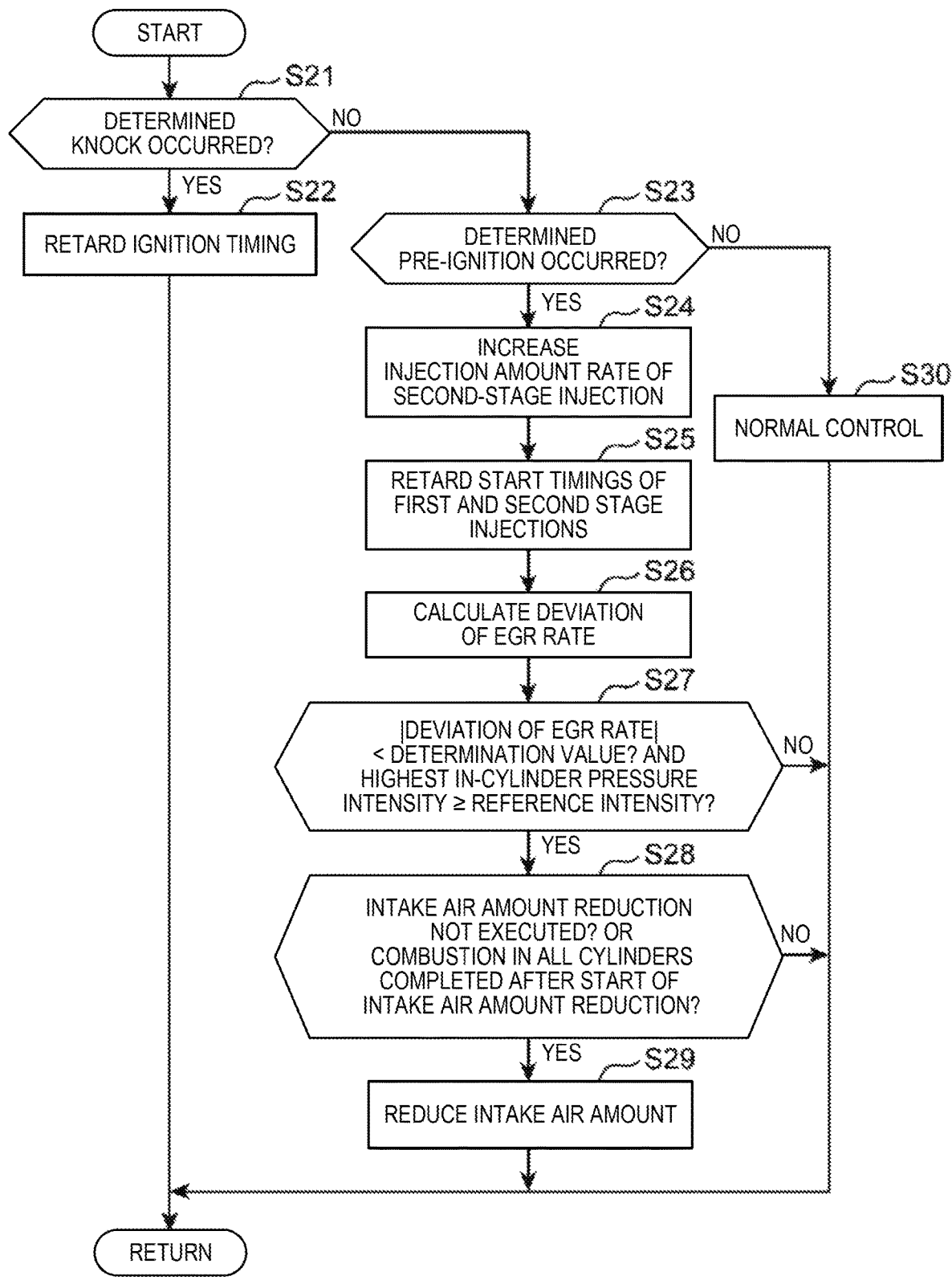
FIG. 20 is a flowchart illustrating a flow of an abnormal combustion avoidance control.

The flowchart of FIG. 20 summarizes the abnormal combustion avoidance control described above.

At Step S21, the abnormal combustion avoidance controlling module 120 determines whether the abnormal combustion determining module 110 determines that knocking has occurred. When this determination is YES and knocking is determined to have occurred, the flow proceeds to Step S22. At Step S22, the abnormal combustion avoidance controlling module 120 retards the ignition timing and ends the flow (returns to Step S1).

On the other hand, if the determination at Step S21 is NO and knocking is determined to have not occurred, the flow proceeds to Step S23. At Step S23, the abnormal combustion avoidance controlling module 120 determines whether the abnormal combustion determining module 110 determines that the pre-ignition has occurred. If this determination is NO and the pre-ignition is determined to have not occurred, the flow proceeds to Step S30. At Step S30, the abnormal combustion avoidance control is not executed, and the ECU 100 executes the normal control.

On the other hand, when the determination at Step S23 is YES and the pre-ignition is determined to have occurred, the flow proceeds to Step S24 where the abnormal combustion avoidance controlling module 120 increases the rate of the injection amount of the second-stage injection, and at Step S25, it retards the execution timings (start timings) of the first and second stage injections than in the normal control.

If the determination at Step S23 is YES, the ECU 100 calculates the deviation of the EGR rate from the target value at Step S26.

Specifically, the target EGR rate, which is the target value of the EGR rate, is set beforehand and stored in the ECU 100. For example, the target EGR rate is set beforehand according to the engine speed, the engine load, etc. and is stored in a map in the ECU 100. The ECU 100 extracts a value corresponding to the current engine speed and load from the map. Further, the ECU 100 estimates the EGR rate of the mixture gas based on the intake air amount detected by airflow sensor SN4 and the difference in pressure between the upstream and downstream sides of the EGR valve 53 which is detected by the pressure difference sensor SN6. At Step S26, the ECU 100 calculates a difference between the estimated EGR rate and the target EGR rate, that is, a deviation of the EGR rate.

After Step S26, the flow proceeds to Step S27. At Step S27, the abnormal combustion avoidance controlling module 120 determines whether the condition is satisfied in which the absolute value of the deviation of the EGR rate calculated at Step S26 is below the determination value and the highest in-cylinder pressure intensity CPLF is greater than or equal to the reference intensity. The determination value and the reference intensity are set beforehand and stored in the ECU 100.

If the determination at Step S27 is NO and the above condition is not satisfied, the flow ends as it is (returns to Step S1). On the other hand, if the determination at Step S27 is YES and the above condition is satisfied, the flow proceeds to Step S28.

At Step S28, the abnormal combustion avoidance controlling module 120 determines whether the condition is satisfied in which the intake air amount reduction control at Step S29 described below has not yet been executed or the combustion completed in all the cylinders 2 after the start of the intake air amount reduction control. If the determination at Step S28 is NO, that is, the intake air amount reduction control has been executed and the combustion has not completed in all the cylinders 2 after the intake air amount reduction control is started, the flow ends as it is (returns to Step S1). On the other hand, when the determination at Step S28 is YES, that is, the intake air amount reduction control has not been executed or the combustion in all the cylinders 2 has been completed after the intake amount reduction control is started, the flow proceeds to Step S29. At Step 29, the abnormal combustion avoidance controlling module 120 executes the intake air amount reduction control for reducing the intake air amount and the flow ends (returns to Step S1). Specifically, the abnormal combustion avoidance controlling module 120 reduces (narrows) the opening of the throttle valve 32 to lower the intake air amount introduced into each combustion chamber 6, as described above.

(5) Effects, Etc.

As described above, in this embodiment, the abnormal combustion determining module 110 determines that the abnormal combustion has occurred, by using the spectrum of a partial frequency component of the in-cylinder pressure waveform detected by the in-cylinder pressure sensor SN3. The partial frequency component is lower than the first frequency. Therefore, as described above, the influence of the cavernous resonance during the combustion of the mixture gas is eliminated, and the combustion state of the mixture gas as to whether the abnormal combustion has occurred is determined accurately, regardless of the position of the in-cylinder pressure sensor SN3. Further, when the highest in-cylinder pressure intensity CPLF, which is the highest value of the in-cylinder pressure spectrum highly correlated with combustion noise, is greater than or equal to the determination intensity, the abnormal combustion in which the progress of combustion of the mixture gas is excessively fast and combustion noise increases is determined to have occurred. Therefore, the occurrence of the abnormal combustion is accurately determined.

Further, in this embodiment, as described above, when the index period, which is the period from the ignition timing to the combustion center-of-gravity timing, is longer than or equal to the determination period, and when the highest in-cylinder pressure intensity CPLF is greater than or equal to the determination intensity, knocking, which the progress of the combustion of the mixture gas is changeable by changing the ignition timing, is determined to have occurred. When the index period is shorter than the determination period and the highest in-cylinder pressure intensity CPLF is greater than or equal to the determination intensity, pre-ignition, which the progress of the combustion of the mixture gas cannot change by changing the ignition timing, is determined to have occurred. Thus, the abnormal combustion is determined by further differentiating knocking and the pre-ignition from each other by using the index period.

Further, when knocking is determined to have occurred, the ignition timing is retarded, and thus, a further occurrence of knocking is prevented.

In addition, when the pre-ignition is determined to have occurred, the control for avoiding the occurrence thereof is executed, and thus a further occurrence of the pre-ignition is prevented.

Particularly, in this embodiment, when the pre-ignition is determined to have occurred, the fuel injection execution timing is retarded. Therefore, as described above, even when a pre-ignition which is difficult to be prevented by changing the ignition timing occurs, the progress of the mixing and reaction of the air and fuel until reaching near CTDC is retarded, and the further occurrence of pre-ignition is prevented. In addition, by injecting the fuel at a close timing to CTDC, the temperature of the mixture gas can be effectively reduced by the latent heat of vaporization of the fuel, and also by this, the reaction of the mixture gas is slowed down and the occurrence of pre-ignition is prevented.

Further, in this embodiment, when the pre-ignition is determined to have occurred, the intake air amount introduced into the combustion chamber 6 is reduced. Therefore, the air amount in the combustion chamber 6 is reduced, and the mixing and reaction of air and fuel until reaching near CTDC is slowed down, and the occurrence of pre-ignition is more reliably prevented.

In this embodiment, when the pre-ignition is determined to have occurred, the intake air amount is reduced only when the condition in which the absolute value of the deviation of the EGR rate is below the determination value and the highest in-cylinder pressure intensity CPLF is greater than or equal to the reference intensity is satisfied. However, regardless of the satisfaction of this condition, the intake air amount may be reduced when the pre-ignition is determined to have occurred.

(6) Modifications

In the above embodiment, the case is described in which the pre-ignition is determined to have occurred when the combustion cycle in which the highest in-cylinder pressure intensity CPLF is greater than or equal to the determination intensity and the index period is shorter than or equal to the determination period in one cylinder continues a plurality of times (for at least the determination threshold number of times). However, the pre-ignition may be determined to have occurred when such a combustion cycle occurs once. Note that according to the configuration of the above embodiment, it is avoided that the pre-ignition is determined to have occurred due to an erroneous calculation of the highest in-cylinder pressure intensity CPLF and/or the index period. Further, it is avoided that the pre-ignition is determined to have occurred when temporarily the highest in-cylinder pressure intensity CPLF becomes greater than or equal to the given determination intensity and the index period becomes shorter than or equal to the determination period, and then the fuel injection pattern, etc. are changed. Thus, the opportunity for changing the fuel injection pattern, etc. is reduced.

In the above embodiment, the case where the engine performs the SPCCI combustion is described; however, the combustion mode performed by the engine is not limited to this. Moreover, the abnormal combustion determination and abnormal combustion avoidance control may be performed outside the second operating range B.

Further, in the above embodiment, the parameter used for determining whether the abnormal combustion has occurred in comparison to the determination intensity is set to the highest value of the spectrum of the in-cylinder pressure from the second frequency to the first frequency (highest in-cylinder pressure intensity CPLF). Alternatively, an average value of the spectra of the in-cylinder pressure from the second frequency to the first frequency may be used as the parameter. Furthermore, whether the abnormal combustion has occurred may be determined based on the spectrum of the in-cylinder pressure including a frequency component less than the second frequency.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
2 Cylinder
6 Combustion Chamber
15 Injector

32 Throttle Valve
100 ECU
110 Abnormal Combustion Determining Module
111 Band-pass Filtering Module (Filtering Module)
114 Highest In-cylinder Pressure Intensity Calculating Module (Intensity Calculating Module)
115 Comparative Determining Module (Determining Module)
SN3 In-cylinder Pressure Sensor

What is claimed is:

1. A control device for controlling an engine including an injector that supplies fuel into a cylinder and an in-cylinder pressure sensor that detects an in-cylinder pressure being a pressure inside the cylinder, comprising:
a processor configured to execute an abnormal combustion determining module to determine whether combustion of a mixture gas inside the cylinder is abnormal based on a detection value of the in-cylinder pressure sensor, the abnormal combustion determining module determining that abnormal combustion has occurred in which progress of the combustion of the mixture gas is excessively fast, when an in-cylinder pressure intensity that is a spectrum value of a frequency component of an in-cylinder pressure waveform detected by the in-cylinder pressure sensor less than a given reference frequency is greater than or equal to a given determination intensity, wherein the abnormal combustion determining module includes:
a filtering module configured to extract a frequency component less than the reference frequency and greater than a given second reference frequency from the in-cylinder pressure waveform detected by the in-cylinder pressure sensor;
an intensity calculating module configured to calculate a value of the spectrum of the extracted frequency component as the in-cylinder pressure intensity; and
a determining module configured to determine that the abnormal combustion has occurred when the in-cylinder pressure intensity calculated by the intensity calculating module is greater than or equal to the determination intensity; and
an ignition plug configured to ignite the mixture gas inside the cylinder at a given ignition timing,
wherein the abnormal combustion determining module determines that a first abnormal combustion, in which the progress of the combustion of the mixture gas is changeable by changing the ignition timing, has occurred when an index period from the ignition timing to a timing of completion of combustion of a given rate of fuel supplied to the cylinder in one combustion cycle is a given determination period or longer and the in-cylinder pressure intensity is greater than or equal to the determination intensity, and determines that a second abnormal combustion, in which the progress of the combustion of the mixture gas is not changeable by changing the ignition timing, has occurred when the index period is shorter than the determination period and the in-cylinder pressure intensity is greater than or equal to the determination intensity.

2. The control device of claim 1, wherein the injector retards a fuel injection timing when the abnormal combustion determining module determines that the second abnormal combustion has occurred.

3. The control device of claim 1, further comprising a throttle valve configured to change an amount of air introduced into the cylinder,
wherein the throttle valve reduces the amount of air introduced into the cylinder when the abnormal combustion determining module determines that the second abnormal combustion has occurred.

4. The control device of claim 1, wherein when the abnormal combustion determining module determines that the first abnormal combustion has occurred, the ignition plug retards the timing of igniting the mixture gas.

5. The control device of claim 1, wherein the abnormal combustion determining module determines that the second abnormal combustion has occurred when the in-cylinder pressure intensity in the cylinder is greater than or equal to the determination intensity and a combustion cycle in which the index period is the determination period or shorter continues for a given number of times.

6. The control device of claim 1, wherein the injector and the ignition plug supply the fuel into the cylinder and ignite the mixture gas inside the cylinder such that a portion of the mixture gas in the cylinder is ignited by the ignition plug and combusts by spark ignition and the remaining mixture gas combusts by self-ignition.

* * * * *